United States Patent
Kalofonos et al.

(10) Patent No.: US 6,810,246 B1
(45) Date of Patent: Oct. 26, 2004

(54) METHOD AND SYSTEM FOR ANALYZING DIGITAL WIRELESS NETWORK PERFORMANCE

(75) Inventors: Dimitris N. Kalofonos, Watertown, MA (US); Rajamani Ganesh, Bedford, MA (US); Donna Fagen, Lexington, MA (US); Vincent A. O'Byrne, Boston, MA (US); Ning Yang, Burlington, MA (US)

(73) Assignee: Verizon Laboratories Inc., Waltham, MA (US)

( * ) Notice: Subject to any disclaimer, the term of this patent is extended or adjusted under 35 U.S.C. 154(b) by 434 days.

(21) Appl. No.: 09/694,450

(22) Filed: Oct. 23, 2000

(51) Int. Cl.[7] .................................................. H04Q 7/20
(52) U.S. Cl. ........................ 455/423; 455/424; 455/450; 455/67.11; 455/522; 455/453; 455/422; 370/241; 707/500
(58) Field of Search ................................. 455/423, 424, 455/422, 450, 67.11, 522, 453; 707/500; 370/241

(56) References Cited

U.S. PATENT DOCUMENTS

| | | | | |
|---|---|---|---|---|
| 5,710,758 A | * | 1/1998 | Soliman et al. | 370/241 |
| 6,035,183 A | * | 3/2000 | Todd et al. | 455/226.2 |
| 6,144,861 A | * | 11/2000 | Sundelin et al. | 455/522 |
| 6,310,868 B2 | * | 10/2001 | Uebayashi et al. | 370/335 |

* cited by examiner

Primary Examiner—Erika Gary
Assistant Examiner—David Nguyen
(74) Attorney, Agent, or Firm—Leonard C. Suchyta, Esq.; Joel Wall, Esq.; Meschkow & Gresham, PLC

(57) ABSTRACT

A system (36) provides a network designer with a mechanism for analyzing the performance of a code division multiple access wireless network (20). The system (36) includes executable code in the form of a probable server identification module (52), a forward link initial estimation module (54), a reverse link initial estimation module (56), a forward link analysis module (58), and a reverse link analysis (60). The modular architecture of the modules (52, 54, 56, 58, and 60) are appropriately configured and interconnected in order to form a network performance analysis process (62) that accurately analyzes both the reverse link performance and the forward link performance of the network (20).

18 Claims, 11 Drawing Sheets

METHOD AND SYSTEM FOR ANALYZING DIGITAL WIRELESS NETWORK PERFORMANCE

RELATED PATENTS

The present invention is related to:

"System and Methods for Rapidly Determining CDMA Network Performance," by O'Byrne et al., U.S. patent application Ser. No. 09/547,970 filed Apr. 12, 2000 and incorporated by reference herein.

TECHNICAL FIELD OF THE INVENTION

The present invention relates to the field of communication systems. More specifically, the present invention relates to systems and methods that analyze the performance of a digital wireless network.

BACKGROUND OF THE INVENTION

The wireless communication industry has made tremendous strides in commercial operations throughout the world. Growth in major metropolitan areas has far exceeded expectations and is rapidly outstripping network capacity, that is, the information carrying ability of the network. Digital communication technologies, such as Code Division Multiple Access (CDMA), Time Division Multiple Access (TDMA), Global System for Mobile Communications (GSM), and so forth, are emerging as techniques for increasing the capacity of wireless networks to support call traffic. Such digital technologies result in substantial increases of capacity of the RF spectrum, for example, up to ten times that of an analog technology, such as the Advanced Mobile Phone Service (AMPS). In addition, digital technology has the potential to mitigate three major problems encountered by users of analog technology, i.e., static, loss/interruption of signal when passing between cells, and failure to get a connection because of congestion.

In order to design efficient digital wireless networks, designers need to be able to quickly and accurately evaluate the performance of a proposed wireless communication network, such as a CDMA wireless network. An accurate network analysis can be used to evaluate the network design and identify problematic sectors or cells. In addition, an accurate network analysis will allow the network designer to better estimate how well equipment settings will perform given the required, or expected, call traffic levels.

A CDMA wireless network provides the capability of two-way communication between a number of user mobile stations and corresponding servers, or base stations. Each direction of communication is performed on a separate radio link and involves a different set of system functions. The communication link from a server to a mobile station is referred to as the forward link and the link from a mobile station to a server is referred to as the reverse link.

In CDMA, network performance is defined by both the forward link and the reverse link. However, the performance of a CDMA network depends largely on system functions exercised by servers in the forward link because most of the information on timing and synchronization occurs on this link. Accordingly, the forward link behavior contributes significantly to overall network performance. Nevertheless, the amount of call traffic that can be supported, which determines the interference levels and ultimately the performance of both links, depends on the most limiting link, either the forward or the reverse link.

The forward link may be considered to be more limiting in a CDMA network scenario in which there are many servers, because a large number of servers correspondingly increases the interference experienced at the mobile station. Thus, the transmit power in the forward link may need to increase in order to overcome the interference. However, equipment settings may limit the system's ability to compensate for the performance and thus the system at this location becomes forward limited. In an alternative scenario, the reverse link may be considered to be more limiting due to hardware constraints such as the particular type of voice coder, or vocoder, or limited transmit power used by the mobile stations.

The performance of the network depends on the most limiting link because the requirements of both links should desirably be satisfied in order for communication to be established. Therefore, the performances of the two links are tightly coupled. In an ideal network model and without considering any practical limitation, an analysis of both links should desirably be part of the same iterative procedure due to this tight coupling. Unfortunately, such an iterative process is extremely complex and impractical because of the excessive computation time that would be required.

Thus, what is needed is a system and method that accurately analyze network performance of both the forward and reverse links in a time and cost effective manner while maintaining overall system operation integrity.

SUMMARY OF THE INVENTION

Accordingly, it is an advantage of the present invention that a system and method is provided for analyzing the performance of a digital wireless communication network.

It is another advantage of the present invention that the system and method provide an accurate analysis of both forward link and reverse link performance.

It is another advantage of the present invention that a flexible architecture is provided that can be appropriately configured and interconnected to analyze the performance of the network in response to the more limiting of the forward and reverse links.

It is yet another advantage of the present invention that the system and method provide an accurate analysis of network performance while taking into consideration the practical limitations of computation complexity, execution time, and cost.

The above and other advantages of the present invention are carried out in one form by a computer-based method for analyzing a performance of a digital wireless network having sectors, the sectors being defined by locations. The method calls for identifying probable servers for the locations in the network and performing an initial reverse link assessment of the network. The method further calls for executing a forward link analysis in response to the performing operation and implementing a reverse link analysis in response to the executing operation.

The above and other advantages of the present invention are carried out in another form by a computing system for analyzing a performance of a digital wireless network having sectors, the sectors being defined by locations. The computing system includes a processor, a computer-readable storage medium, and executable code recorded on the computer-readable storage medium for instructing the processor to analyze the performance of the network. The executable code includes a probable server identification module for identifying probable servers for the locations in the network. A reverse link initial estimation module provides an initial reverse link assessment of the network, and a forward link initial estimation module provides an initial forward link assessment of the network. A forward link analysis module analyzes a forward link performance of the network, and a reverse link analysis module analyzes a reverse link performance of the network. The forward link analysis module analyzes the forward link performance in response to the initial reverse link assessment or the analyzed reverse link performance. Likewise, the reverse link analysis module analyzes the reverse link performance in response to the initial forward link assessment or the analyzed forward link performance.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
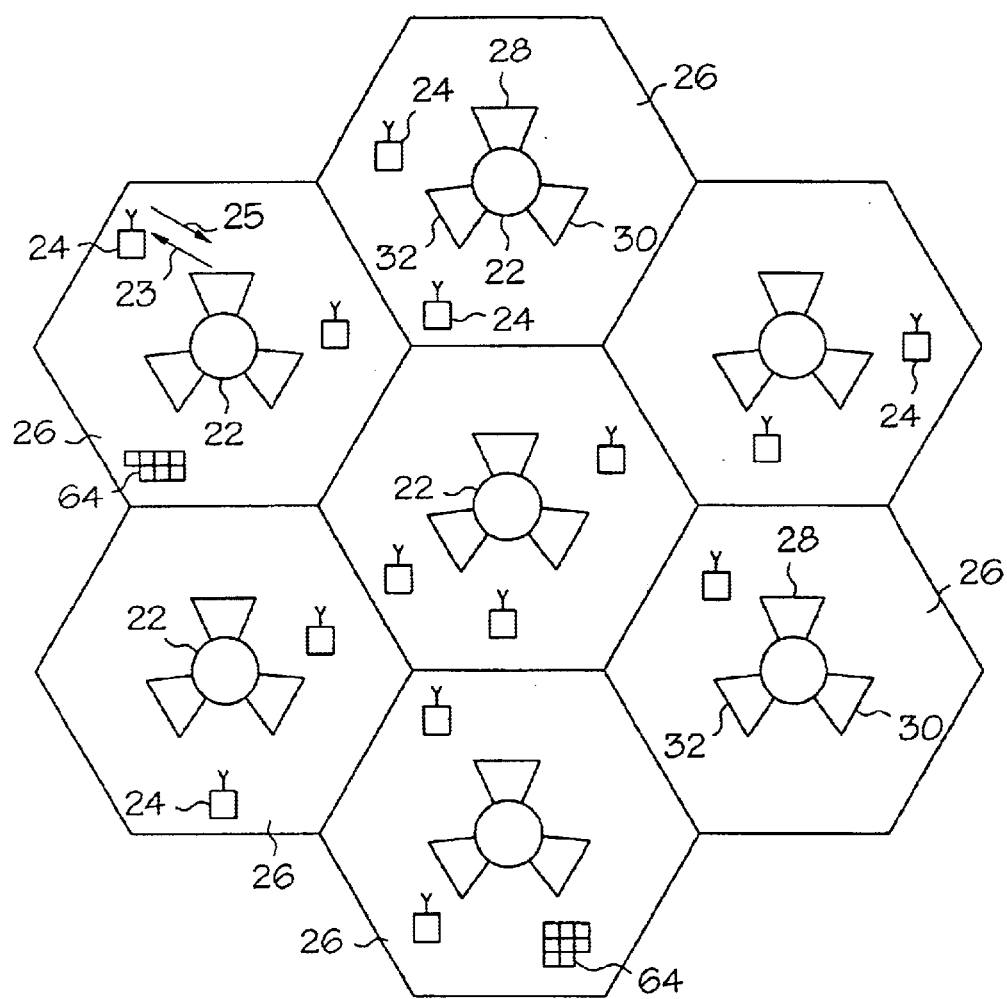
FIG. 1 shows a block diagram of an exemplary digital wireless communication network.

FIG. 1 shows a block diagram of an exemplary digital wireless communication network 20. Network 20 includes a number of base stations, or servers 22, through which two-way communication radio links are established between network 20 and mobile stations 24. For example, a forward link 23 may be established from one of servers 22 to one of mobile stations 24 and a reverse link 25 may be established from the one of mobile stations 24 to the one of servers 22 to form the two-way communication radio link.

In an exemplary embodiment, servers 22 operate using a code division multiple access (CDMA) digital communication technology. Those skilled in the art will recognize that in a CDMA digital wireless network, mobile station 24 may be in two-way communication with more than one of servers 22, i.e., those servers 22 in the active set for mobile station 24. Servers 22 in a mobile station's active set are those servers 22 whose signal is demodulated at the rake receiver of mobile station 24.

Mobile stations 24 are conventional digital wireless communication devices, such as a cellular telephone, a personal digital assistant, and so forth, that communicate with servers 22 in a manner known to those skilled in the art.

Each server 22 controls communication in at least one of a number of wireless coverage areas, i.e., cells 26, or a sector of one of cells 26 via directional antennas 28, 30, and 32. The terms "cell" and "sector" represent radio coverage areas within network 20. As such, cell and sector may be used interchangeably herein. Servers 22 may alternatively include one or more omni-directional antennas. While network 20 shows only seven of cells 26, the actual number of cells 26 may be larger or smaller in practice. In addition, cells 26 are shown as being generally hexagonal in shape. This hexagonal representation is convenient for schematically denoting a cell's radio coverage area. Those skilled in the art will appreciate that the actual shape and size of cells 26 will vary from cell to cell, and between technology types.

As digital wireless technology, such as CDMA, evolves and the advantages of digital wireless technology over analog technology become more apparent, it is anticipated that the number of subscribers to the digital wireless technology will grow. This growing subscriber base will lead to ever increasing call traffic loads and increased interference between subscribers. The present invention accurately analyzes the network design to identify problematic areas within sectors or cells. An accurate analysis allows a network designer to evaluate the ability of servers 22 to accommodate the increased call traffic loads, to determine the level of interference, to set transmission power levels of servers 22, to determine the quantities of related terminating and switching equipment needed to meet the increased traffic loads, to make channel assignments, and so forth.

Figure 2:
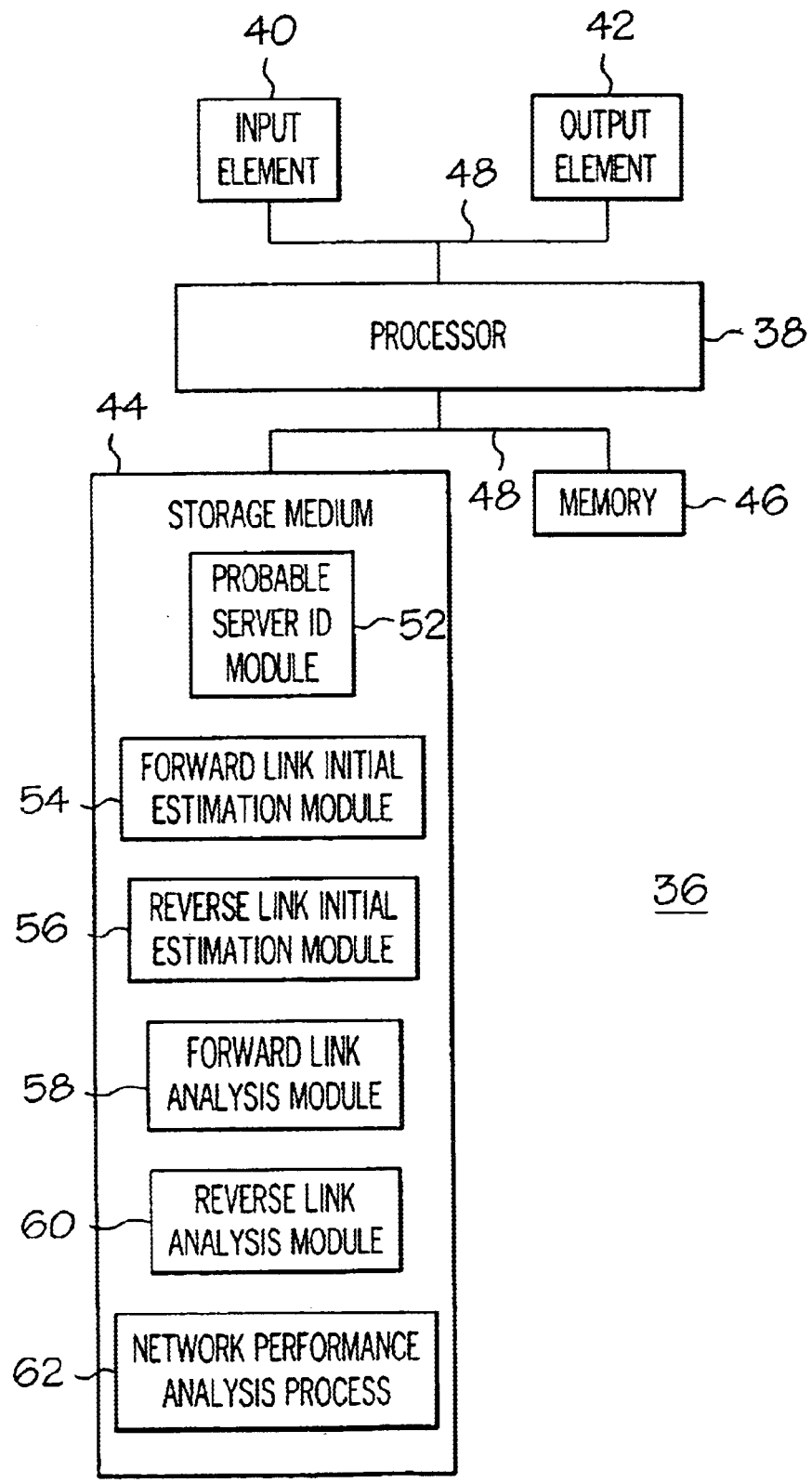
FIG. 2 shows a block diagram of a computing system for analyzing the performance of the exemplary digital wireless communication network of FIG. 1.

FIG. 2 shows a block diagram of a computing system 36 for analyzing the performance of digital wireless communication network 20 (FIG. 1). System 36 includes a processor 38 on which the methods according to the invention can be practiced. Processor 38 is in communication with an input element 40, an output element 42, a computer-readable storage medium 44, and memory 46. These elements are interconnected by a bus structure 48. The components of system 36 may be implemented utilizing several known off-the-shelf components.

Memory 46 is addressable storage space, accessible by processor 38, which stores information or instructions for use. Processor 38 includes a data reader (not shown) for reading information from memory 46. The data reader may include a hard disk drive internal or external to processor 38, a tape drive, floppy disk drive, CD-ROM, or a combination thereof. Memory 46 may be a hard disk, floppy disk, a compact disk, a personal computer memory card international association (PCMCIA) card, and the like.

Input device 40 can encompass a keyboard, mouse, pointing device, audio device (e.g., a microphone), or other devices providing input to processor 38. Output device 42 can encompass a display, a printer, an audio device (e.g., a speaker), or other devices providing output from processor 38. Input and output devices 40 and 42 can also include network connections, modems, or other devices used for communications with other computer systems or devices.

Computer-readable storage medium 44 may be a hard disk drive internal or external to processor 38, a magnetic disk, compact disk, or any other volatile or non-volatile mass storage system readable by processor 38. Computer-readable storage medium 44 may also include cooperating or interconnected computer readable media, which exist exclusively on computing system 36 or are distributed among multiple interconnected computer systems (not shown) that may be local or remote.

Executable code, in the form of a probable server identification module 52, a forward link initial estimation module 54, a reverse link initial estimation module 56, a forward link analysis module 58, and a reverse link analysis module 60 are employed to assemble a network performance analysis process 62. Process 62, recorded on computer-readable storage medium 44, is implemented in a network planning tool (not shown) for instructing processor 38 to analyze a performance of digital wireless network 20 (FIG. 1).

Process 62 is assembled utilizing the flexible modular architecture of modules 52, 54, 56, 58, and 60 to provide a full analysis of both forward and reverse links 23 and 25, respectively, (FIG. 1) of communication network 20 (FIG. 1). Moreover, process 62 is assembled to take into account the more limiting of the forward and reverse links 23 and 25. That is, the more limiting of the forward and reverse links 23 and 25 will be analyzed prior to the other of the forward and reverse links 23 and 25 using initial assessment parameters acquired through the execution of one of forward link initial estimation and reverse link initial estimation modules 54 and 56.

Figure 8:
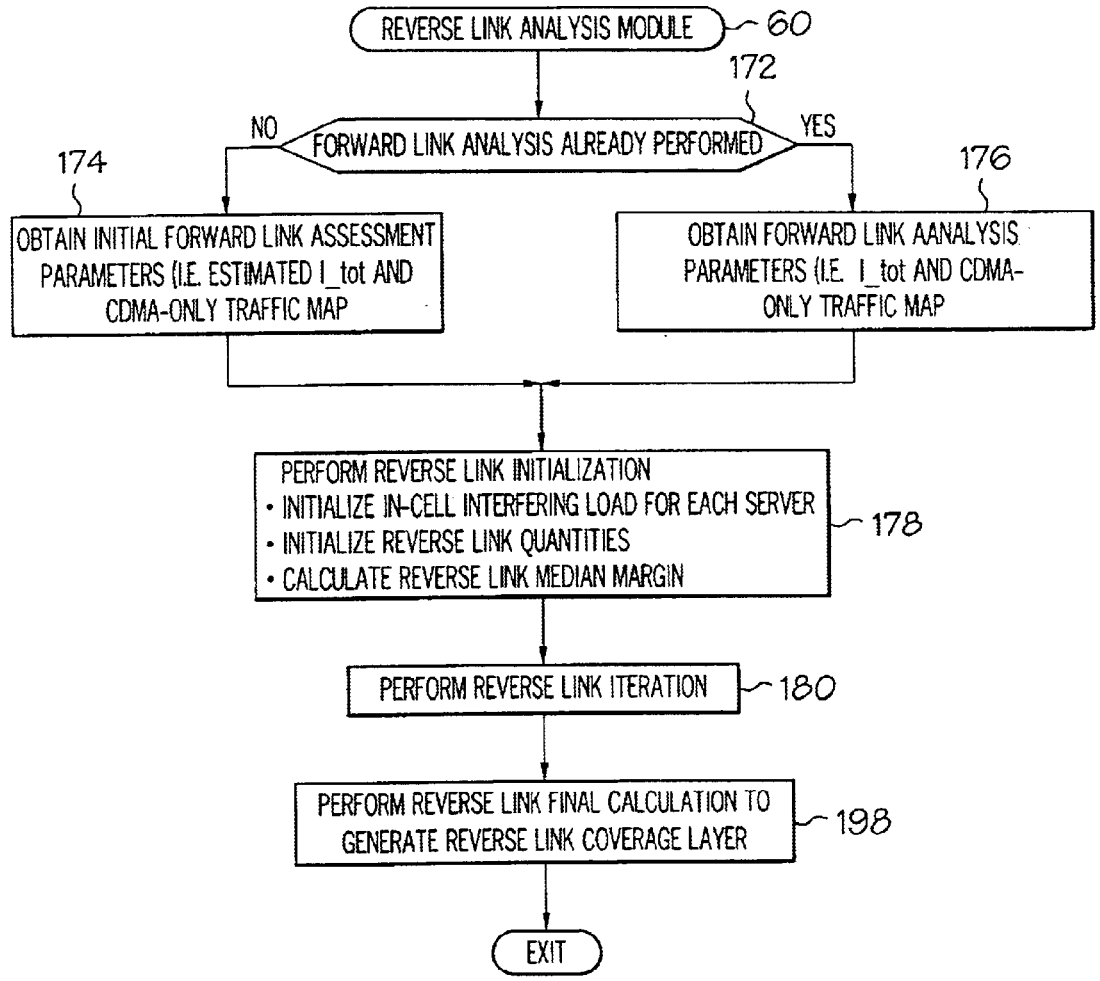
FIG. 8 shows a flow chart of a reverse link analysis module.
Figure 9:
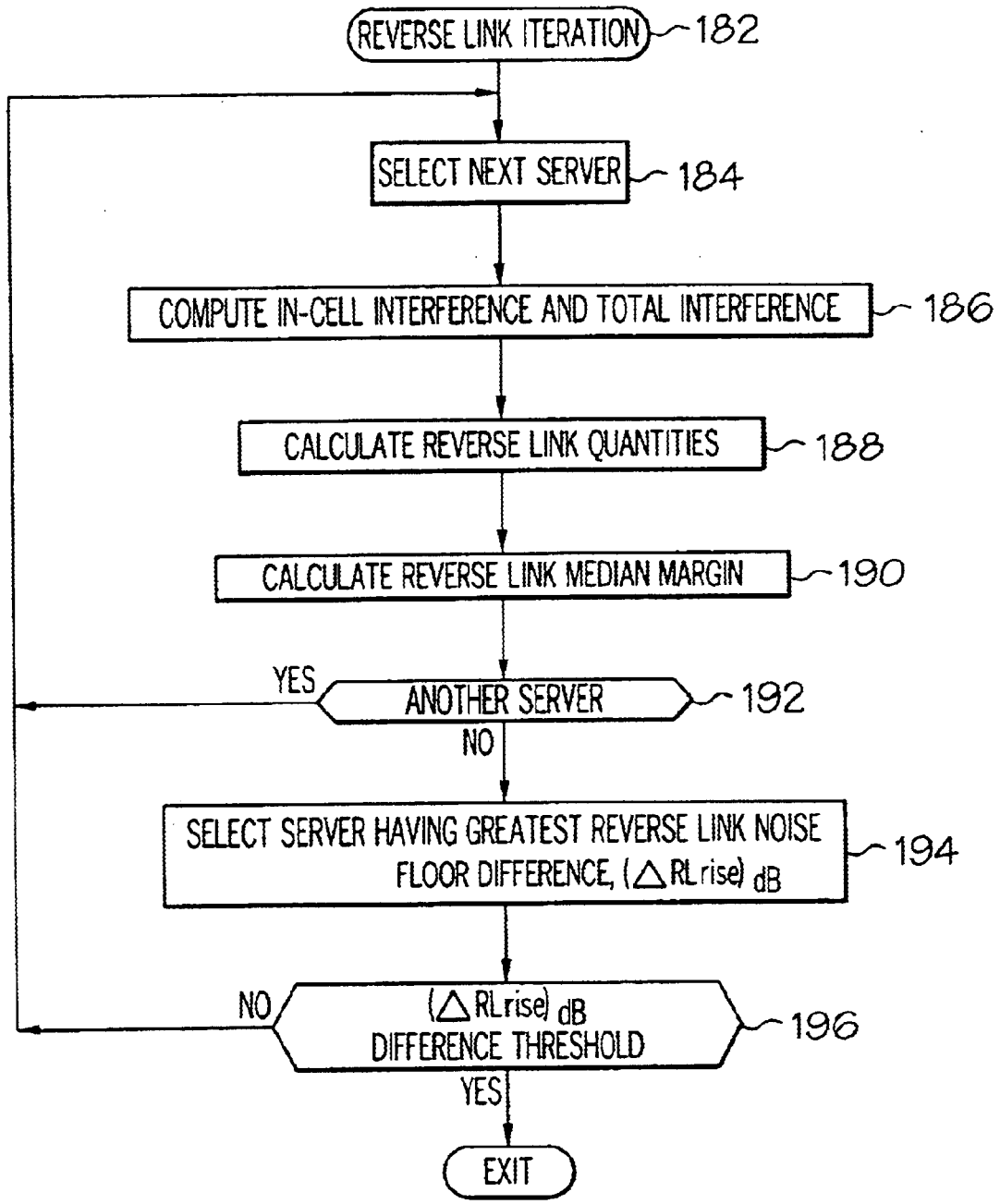
FIG. 9 shows a flow chart of a reverse link iteration process of the reverse link analysis module.
Figure 10:
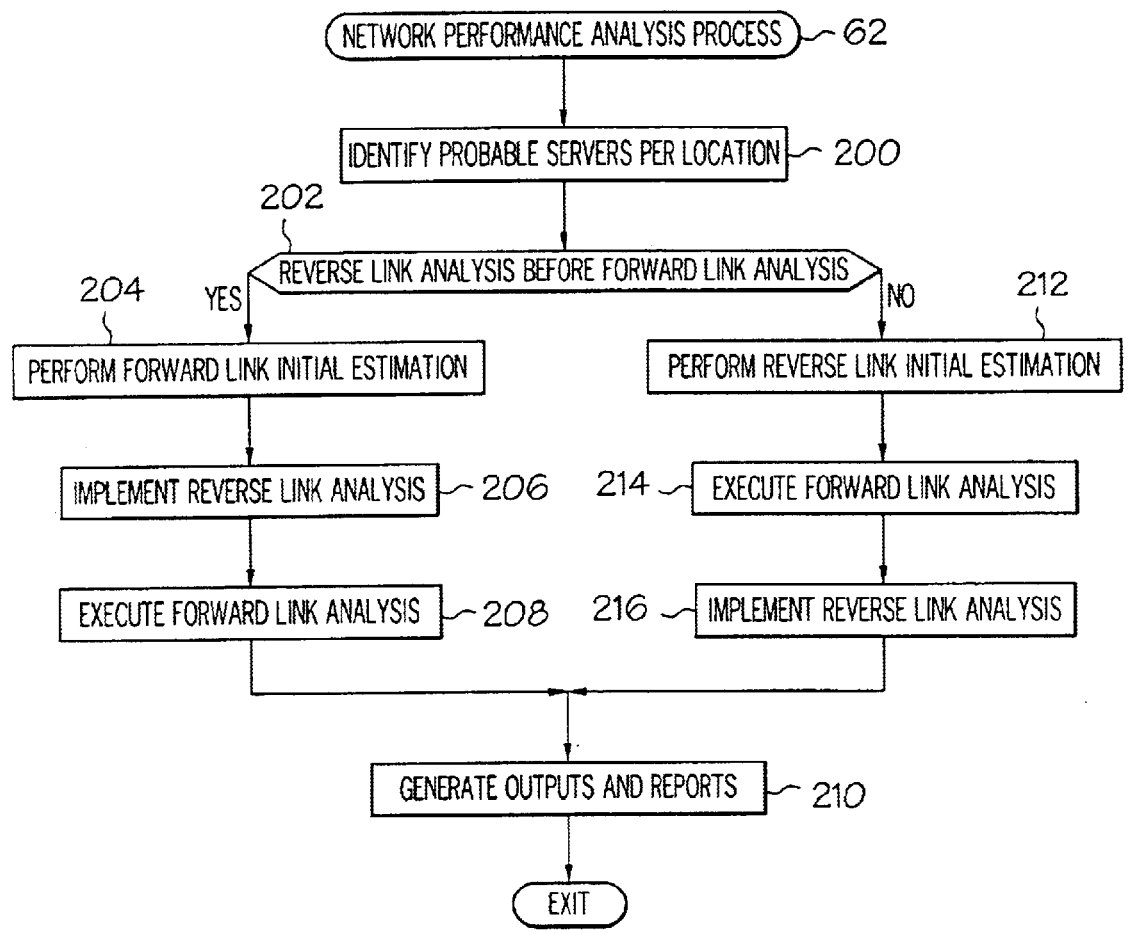
FIG. 10 shows a flow chart of a network performance analysis process.

The following discussion, in combination with a flow of tasks illustrated in FIGS. 3–9, will describe the functions performed by each of modules 52, 54, 56, 58, and 60 and the resulting parameters output through the execution of each of modules 52, 54, 56, 58, and 60. The application of the parameters generated in modules 52, 54, 56, 58, and 60 will be described in connection with a description of network performance analysis process 62 as illustrated in FIG. 10.

Figure 3A:
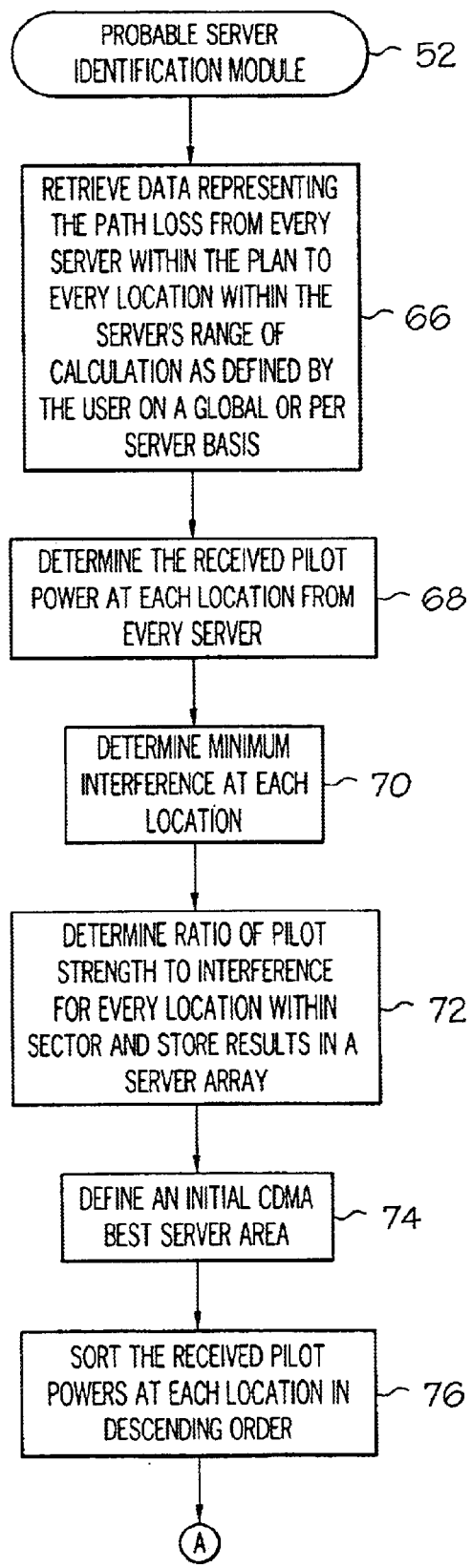
FIGS. 3A and 3B show a flow chart of a probable server identification module.
Figure 3B:
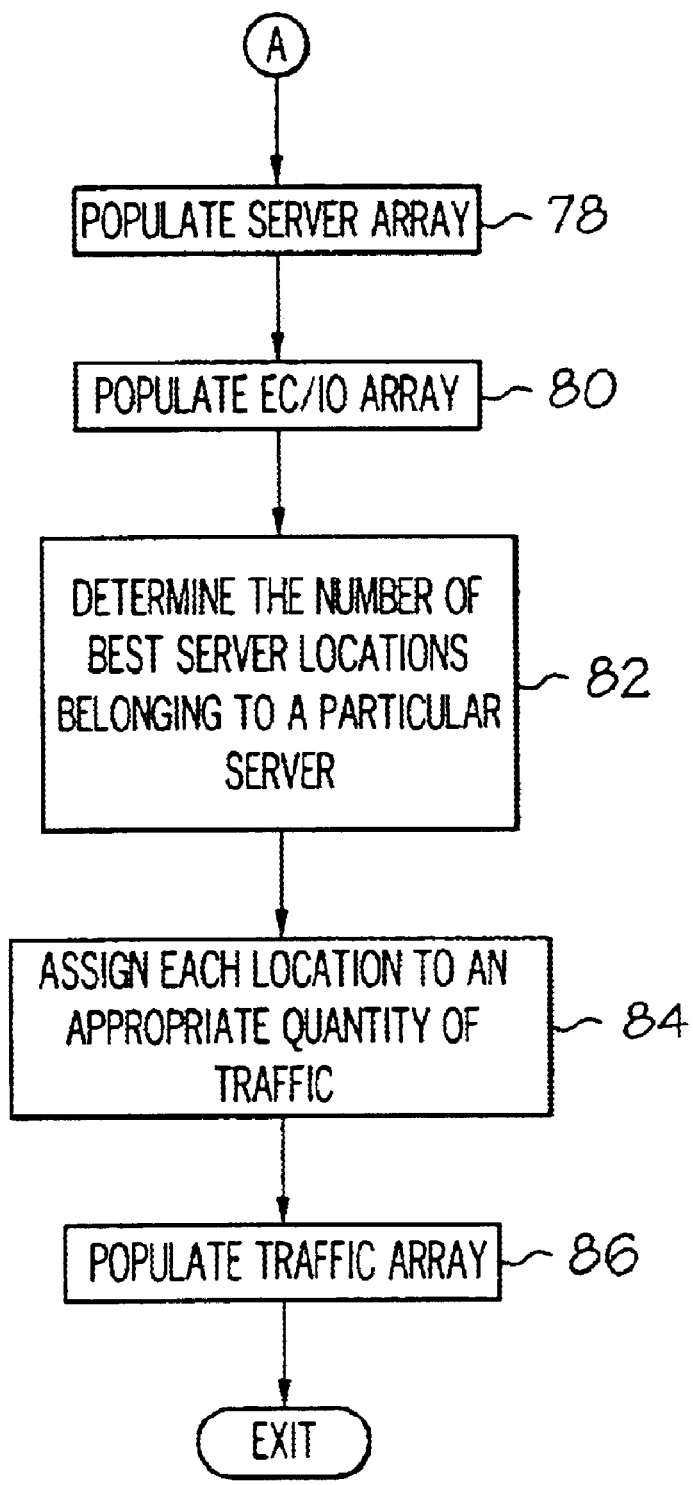

FIGS. 3A and 3B show a flow chart of probable server identification module 52. In other words, FIGS. 3A and 3B illustrate an exemplary process, performed through the execution of probable server identification module 52, for determining CDMA probable servers for each location in network 20 (FIG. 1).

Referring momentarily to FIG. 1, network 20 is subdivided into a plurality of locations 64, of which only a few are shown. Locations 64 are the basic units that make up network 20 and represent the smallest area of interest, i.e. a location, in an actual environment represented by network 20. For example, each of sections 64 may represent a region in an actual environment having an area of approximately one hundred meters by one hundred meters. The actual size of the location is a tradeoff between accuracy (more locations, or higher resolution) and increased processing speed (fewer locations, or reduced resolution).

In CDMA, the probable servers for a given one of locations 64 is a list that contains the most probable servers 22 (up to a number equal to a predetermined active set size) that may be in the active set of one of mobile stations 24 (FIG. 1) located at the given one of locations 64. The active set is the set of one or more pilot channels associated with the forward traffic channels that may be assigned to the mobile station. The pilot channel is a forward link channel that is transmitted by a server, and is used as a reference for the detection of all forward link channels transmitted from that server. Among the list of probable servers, the server whose pilot channel has the highest probability to be in the active set of a mobile station at a particular location is called the CDMA Best Server (discussed below).

Referring back to FIGS. 3A and 3B, probable server identification module 52 begins with a task 66. Task 66 causes processor 38 (FIG. 2) to retrieve data representing the path loss from every server 22 (FIG. 1) within network 20 to every location 64 (FIG. 1) within the range of calculation for that server 22, as defined by the user on a global or per server 22 basis. In other words, task 66 uses path loss files (not shown) that may be stored in memory 46 (FIG. 2) of computing system 36 (FIG. 2). The path loss files were generated previously through the execution of a propagation path loss module to determine the path loss, Pl, from every server 22 within the plan to every location 64 within the server's range of calculation. Task 66 ignores any of locations 64 having inadequate field strength (e.g., one of locations 64 lying outside the range of calculation of a particular one of servers 22). In addition, task 66 ignores any of locations 64 due to Land Use Land Cover (LULC) traffic shifting or highway enhancements or whose pilot channel power is sufficiently small.

Following task 66, a task 68 is performed. At task 68, processor 38 (FIG. 2) determines the received CDMA pilot channel power at each location 64 from every server 22 within its server size and range of calculation. The received pilot channel power is determined by:

$$R_{pilot,j} = P_{pilot,j} - L_{fw\_c,j} + G_{t,j} + G_m - Pl_j \quad (1)$$

where $P_{pilot,j}$ is the transmitted power, or signal strength, of the CDMA pilot channel in dBW at server j, $G_{t,j}$ is the antenna gain of server j in dBi in the direction of the location of interest, $G_m$ is the antenna gain of wireless station 24 in that location 64 in dBi as seen by server 22, $L_{fw\_c,j}$ is the forward cable loss at this server j, and $Pl_j$ is the path loss between location 64 and server j. A received pilot channel power value 67 may be temporarily stored in association with one of servers 22 in an array in memory 46 (FIG. 2).

Following task 68, a task 70 is performed. Task 70 determines a representative of the minimum interference, $I_{tot\_min}$, at each of locations 64 (FIG. 1). The minimum interference, $I_{tot\_min}$, for one of locations 64 can be determined, for example, by:

$$I_{tot\_min} = \sum_{j=1}^{M} R_{sync,j} + \sum_{j=1}^{M} R_{paging,j} + \sum_{j=1}^{M} R_{traffic,j} + \sum_{j=1}^{M} R_{pilot,j} \quad (2)$$

where M is the number of servers 22, j, within whose ranges of calculations location 64 resides, $R_{sync,j}$, $R_{paging,j}$, $R_{traffic,j}$, $R_{pilot,j}$, are the powers received at this location 64 from the synchronization, paging, traffic, and pilot channels of server j, respectively, and are given by:

$$R_{sync,j} = P_{sync,j} - L_{fw\_c,j} + G_{t,j} + G_m - Pl_j \quad (3)$$

$$R_{traffic,j} = P_{traffic\_min,j} - L_{fw\_c,j} + G_{t,j} + G_m - Pl_j \quad (4)$$

$$R_{paging,j} = P_{paging,j} - L_{fw\_c,j} + G_{t,j} + G_m - Pl_j \quad (5)$$

where $P_{sync,j}$ and $P_{paging,j}$ denote, respectively, the transmit powers of the sync and paging channels, and $P_{traffic\_min,j}$ represents the minimum transmit power (i.e., the minimum power control allocation of a traffic channel at server j). It should be noted that this power is only representative of the lowest possible traffic power. Other values, such as an average value, are also valid. The process assumes initially that there is only one sync, one paging, and one traffic channel per server 22. It should be noted that the computation of $I_{tot\_min}$ is independent of the size of cell 26 (FIG. 1) or sector of cell 26.

In response to tasks 68 and 70, probable server identification module 52 proceeds to a task 72. Task 72 determines the ratio of the received pilot channel power of one of servers 22 over the total received transmit power from all of servers 22, $E_{c,j}/I_{tot\_min}$. $E_{c,j}/I_{tot\_min}$ is determined using the ratio of the transmit power of the pilot channel, $R_{pilot,j}$, to interference, $I_{tot\_min}$, for every one of locations 64 (FIG. 1) within cell 26, that is, the coverage area, of server 22, j, as follows:

$$E_{c,j}/I_{tot\_min} = R_{pilot,j}/I_{tot\_min} \quad (6)$$

Task 72 subsequently causes processor 38 (FIG. 2) to store the calculated values of $E_{c,j}/I_{tot\_min}$ in a server array (not shown) in, for example, memory 46 (FIG. 2) of computing system 36 (FIG. 2).

Following task 72, a task 74 is performed. Task 74 of process 52 defines an initial CDMA best server area. Task 74 defines one of locations 64 (FIG. 1) to be in the best server area of server 22, j, if location 64 is within the sector size of server 22, j, and the conditions given by the following equations are satisfied:

$$E_{c,j}/I_{tot\_min} > (E_c/I_o)_{threshold} \quad (7)$$

$$E_{c,j}/I_{tot\_min} > E_{c,i}/I_{tot\_min}, \quad (8)$$

where server, j, is not a beacon sector
and for the set of servers $i \in \{1 \ldots M\}$ and $i \neq j$ The threshold value, $(E_c/I_o)_{threshold}$, is defined internally as a global parameter. It is typically a very low value used to eliminate locations 64 where the received pilot channel power, $E_{c,j}$, at one of locations 64 relative to the total received transmit power from all of servers 22, $I_{tot\_min}$, at one of locations 64 is so low that pilot channel acquisition by one of mobile stations 24 at location 64 becomes improbable. Task 74 assumes that any of locations 64 where the above conditions are not satisfied are determined not to have coverage under the loading conditions as stated above.

Following task 74, a task 76 sorts the received power of the pilot channels, $E_{c,j}$, at each of locations 64 in descending order (with the strongest received pilot power first). Sorting task 76 also takes into account the sector size, i.e., size of one of cells 26 (FIG. 1), controlled by each of servers 22 (FIG. 1) and ignores beacon cells. A beacon cell is a type of geographic area controlled by a beacon server that is employed in a dual mode (e.g., AMPS/CDMA) network. The beacon server allows a mobile station user to transition between a geographical area offering analog and digital communication (i.e., dual mode) service and a geographical area providing only analog service.

A task 78 is performed in response to task 76. Task 78 causes processor 38 (FIG. 2) to populate a CDMA probable server array with servers 22 corresponding to the highest received pilot powers, $E_{c,j}$, at each of locations 64 to define a probable active set of pilot channels for each of locations 64. Only servers 22, j, with $E_{c,j}/I_{tot\_min} > (E_c/I_o)_{threshold}$ and for which location 64 lies within their corresponding sector size are included in the list of probable servers of location 64. In other words, CDMA probable server array associates a number of probable servers, up to the size of the active set, with each of locations 64 of network 20. The one of servers 22 whose pilot channel power, $E_{c,j}$, is greatest as determined in sorting task 74 is, by definition, the first (or strongest) in the list of probable servers calculated in task 78.

A task 80 is also performed in response to task 76. Task 80 causes processor 38 to populate the pilot power to interference ratios, $E_{c,j}/I_{tot\_min}$ in a CDMA $E_c/I_o$ ratio array that corresponds to the elements in the CDMA probable server array of task 78. In other words, task 80 uses the highest received pilot powers, $E_{c,j}$, at each of locations 64 to calculate the elements in the CDMA $E_c/I_o$ ratio array.

Following tasks 78 and 80, a task 82 is performed to determine a number of locations 64 for which a particular one of servers 22 may be a CDMA best server, or the server 22 with the highest probability to be in the active set for one of mobile stations 24 (FIG. 1) at locations 64. In other words, by referring to the CDMA probable servers array populated in task 78 and the CDMA $E_c/I_o$ ratio array populated in task 80, a server 22, j, whose corresponding pilot channel power, $E_{c,j}$, received at one of locations 64 and whose corresponding $E_{c,j}/I_{tot\_min}$ may be higher than the others of CDMA probable servers 22 for that location 64 may be determined to be the CDMA best server for that location 64. Task 82 reviews each of locations 64 to determine the number of locations 64 for which a particular one of servers 22 may be a CDMA best server.

Following task 82, a task 84 is performed to assign each of locations 64 with an appropriate amount of call traffic. The appropriate amount of call traffic is based on the total Erlang traffic, or call traffic load, offered to a cell 26, or coverage area of the best server as determined by the user. The call traffic load may be a figure that estimates the number of transmitted and received calls that may be attempted in a given unit of time for a selected server and technology.

Following task 84, a task 86 is performed to populate a CDMA traffic array (not shown) and store the CDMA traffic array in memory 46 (FIG. 2) for later use. The CDMA traffic array includes a listing of each of locations 64 (FIG. 1) of network 20 and the amount of call traffic, in Erlangs, assigned to each of locations 64. Following task 86, processor 38 (FIG. 2) ends the execution of probable server identification module 52 having generated a CDMA probable server array at task 78, a CDMA $E_c/I_o$ ratio array at task 80, and a CDMA traffic array at task 86.

Figure 4:
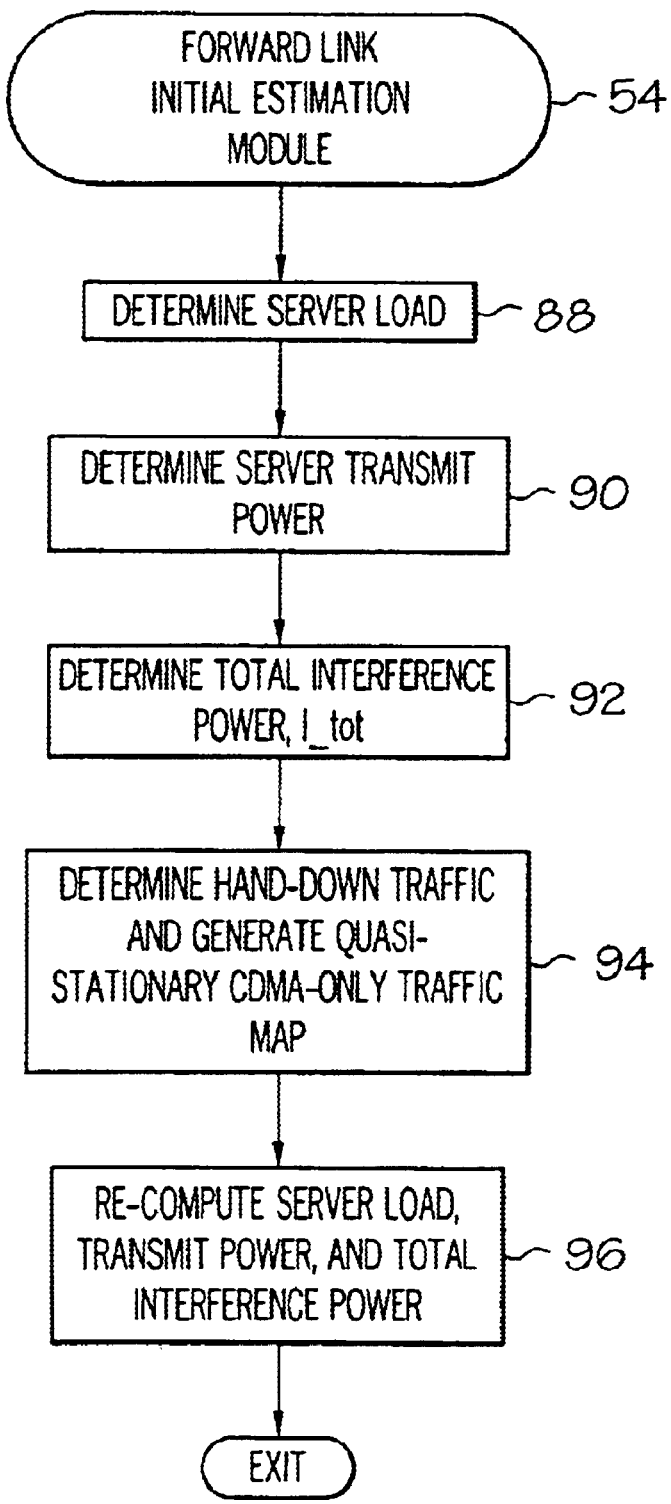
FIG. 4 shows a flow chart of a forward link initial estimation module.

FIG. 4 shows a flow chart of forward link initial estimation module 54. That is, FIG. 4 illustrates an exemplary process performed through the execution of module 54. Forward link initial estimation module 54 is executed to provide an initial forward link assessment of network 20 (FIG. 1) prior to executing reverse link analysis module 60. The estimated parameters resulting from forward link initial estimation module 54 will be inputs for reverse link analysis module 60 when reverse link analysis module 60 (FIG. 2) is implemented prior to forward link analysis module 58 (FIG. 2) in network performance analysis process 62 (FIG. 2).

Module 54 begins with a task 88 At task 88, processor 38 (FIG. 2) determines a server load carried by each of servers 22 (FIG. 1). In other words, task 88 calculates an amount of the call traffic, representing a quantity of users (equivalently represented as a call traffic load, in Erlangs), that is being carried by each server 22.

Task 88 may employ predetermined handoff probabilities. The handoff probabilities indicate the likelihood of a mobile station 24 (FIG. 1) being in a single, two-way, or three-way handoff with more than one of servers 22. Such probabilities may be located, for example, in an array in memory 46 (FIG. 2) of computing system 36 (FIG. 2). Alternatively, the handoff probabilities may be read in from an external source, such as from an external database.

The handoff probabilities are a function of the velocity of mobile station 24, handoff condition of the three strongest received pilot channel powers, $E_{c,j}$, the amount of the call traffic load added per server 22, the call traffic load dropped per server, and the ratios $E_{c,j}/I_{tot\_min}$ in the CDMA $E_c/I_o$ ratio array that correspond to the highest received pilot channel powers, $E_{c,j}$, detected at one of locations 64. The handoff probabilities read from an external database take into account the effects due to Rayleigh and Rician fading, lognormal shadowing, the power control mechanism employed on the overall required ratio of the useful user signal energy per bit over the noise, $E_b/N_o$, and the resultant mean required traffic channel power.

Task 88 determines the call traffic loading at one of servers 22 by analyzing each of locations 64 of network 20 and incrementally updating the call traffic load of the active set of pilots, i.e. the three strongest received pilot channel powers, $E_{c,j}$, at one of locations 64.

Following task 88, a task 90 is performed. Task 90 causes processor 38 (FIG. 2) to determine a server transmit power for each of servers 22. Processor 38 defines the total transmit power for any of servers 22 by using the server load determined in task 88 together with a voice activity factor, v, and the call traffic, pilot, sync, and paging channel powers. The total transmit power, which is calculated for every server j in network 20 may be defined as follows:

$$CDMA\_fw_{13}\_tx\_pow[j] = P_{pilot\_j} + P_{sync\_j} + P_{paging\_j} + CDMA\_Sector\_Load[j](v)(P_{traffic\_nominal\_j}) \quad (9)$$

where voice activity factor, v, is the average duty cycle (active time/total time) of a voice signal, and $P_{traffic\_nominal\_j}$ is the nominal transmit power allocation of a traffic channel at server j.

Following task 90, a task 92 is performed. Task 92 causes processor 38 (FIG. 2) to determine total interference power for each of locations 64, denoted by the character "p". Processor 38 determines the total interference power, I_tot[p] received from all servers 22 in network 20 as the sum of the received power at location 64, p, from server j, as follows:

$$I\_tot[p] = \sum_j (CDMA\_fw\_tx\_pow[j] - path\_loss(j, p)) \quad (10)$$

Where path_loss(j,p) represents the path loss between location p and server j, after applying corrections for the mobile station antenna gain and head or body signal attenuation.

Following task 92, a task 94 is performed. Task 94 is only performed for multiple mode networks, that is networks that offer more than one communication service, for example, a AMPS/CDMA network. Task 94 causes processor 38 (FIG. 2) to determine the hand-down traffic in network 20 (FIG. 1) and determine a digital communication traffic map, or CDMA-only traffic map. The determination of whether the CDMA call traffic at a particular one of locations 64, p, should be handed down to an analog technology is different for beacon servers and border servers. As discussed previously, a beacon server in a beacon cell allows a mobile station user to transition between a geographical area offering digital communication service and a geographical area providing analog service. Likewise, a border server of a border cell allows a transition between a geographical area offering digital service and a geographical area providing analog service. However, a border server carries call traffic.

For those of servers 22 that are beacon servers, if the received $E_{c,j}/I\_tot[p]$ from a beacon server at one of locations 64 is greater than a "beacon-threshold" criterion, the call traffic at that one of locations 64 is handed down to an analog wireless communication system and this call traffic is denoted as beacon traffic. For border servers, if all the pilot channels in the active set for one of locations 64 satisfy a "border-threshold" criterion, then the call traffic at that one of locations 64 is handed down to the analog wireless communication system and this call traffic is denoted as border traffic.

This determination of hand-down call traffic in task 94 may be performed in a two-step process. First, at every location 64, p, (within the user-defined range of calculation), processor 38 compares the $E_{c,j}/I\_tot$ value of any beacon pilot channel in the network to the "beacon-threshold." If it is above the threshold, that call traffic is handed down to the analog system and the call traffic corresponding to this location 64 is deleted from the CDMA traffic array and recorded in a beacon traffic array. If it is below the threshold, that call traffic remains as CDMA traffic in the CDMA traffic array.

Second, processor 38 compares the $E_{c,j}/I\_tot$ value of any border pilot channel in the CDMA probable server array, populated at task 78 (FIG. 3B) of probable server identification module (FIGS. 3A and 3B), to the "border-threshold" criterion. If $E_{c,j}/I\_tot$ satisfies the criterion and all the pilots in the active set for that location 64 are from border servers, that call traffic is handed down to the analog system and the call traffic corresponding to this location 64 is deleted from the CDMA traffic array and recorded in a border traffic array. If the criterion is not satisfied, the call traffic remains as CDMA traffic in the CDMA traffic array. Using the above-described information, forward link initial estimation module 54 generates, at task 94, a CDMA-only traffic map (i.e., a map of the digital call traffic to be offered to CDMA network 20). The remaining call traffic in the CDMA traffic array is subsequently used to form the CDMA-only offered traffic map.

Following task 94, a task 96 is performed to re-compute the server load, transmit power, and total interference power. Task 96 re-computes the server load, transmit power, and total interference power based on the hand-down traffic determination of task 94. Re-computation task 96 may be accomplished by first re-computing the server load and server transmit power, CDMA_fw_tx_pow[j] using equation (9). Since the CDMA call traffic has changed for all border servers and regular servers 22 having beacon servers as their neighbors, the call traffic load for these servers needs to be re-computed using the new values of call traffic, in Erlangs, from the CDMA-only traffic map. Task 96 can then re-compute the total interference power using equation (10) to update the interference power I_tot[p] at all locations 64 pertaining to border sectors. Task 96 may also update the CDMA $E_c/I_o$ ratio array for later use during network analysis.

Following task 96, processor 38 (FIG. 2) ends the execution of forward link initial estimation module 54 having provided an initial forward link assessment of network 20 to be used by reverse link analysis module 60 (FIG. 2). The initial forward link assessment provides estimated parameters that include a CDMA-only traffic map generated at task 94, an updated server transmit power (CDMA_fw_tx_pow [j]), and an updated value of the total interference power (I_tot) at each of locations 64 re-computed at task 96.

Figure 5:
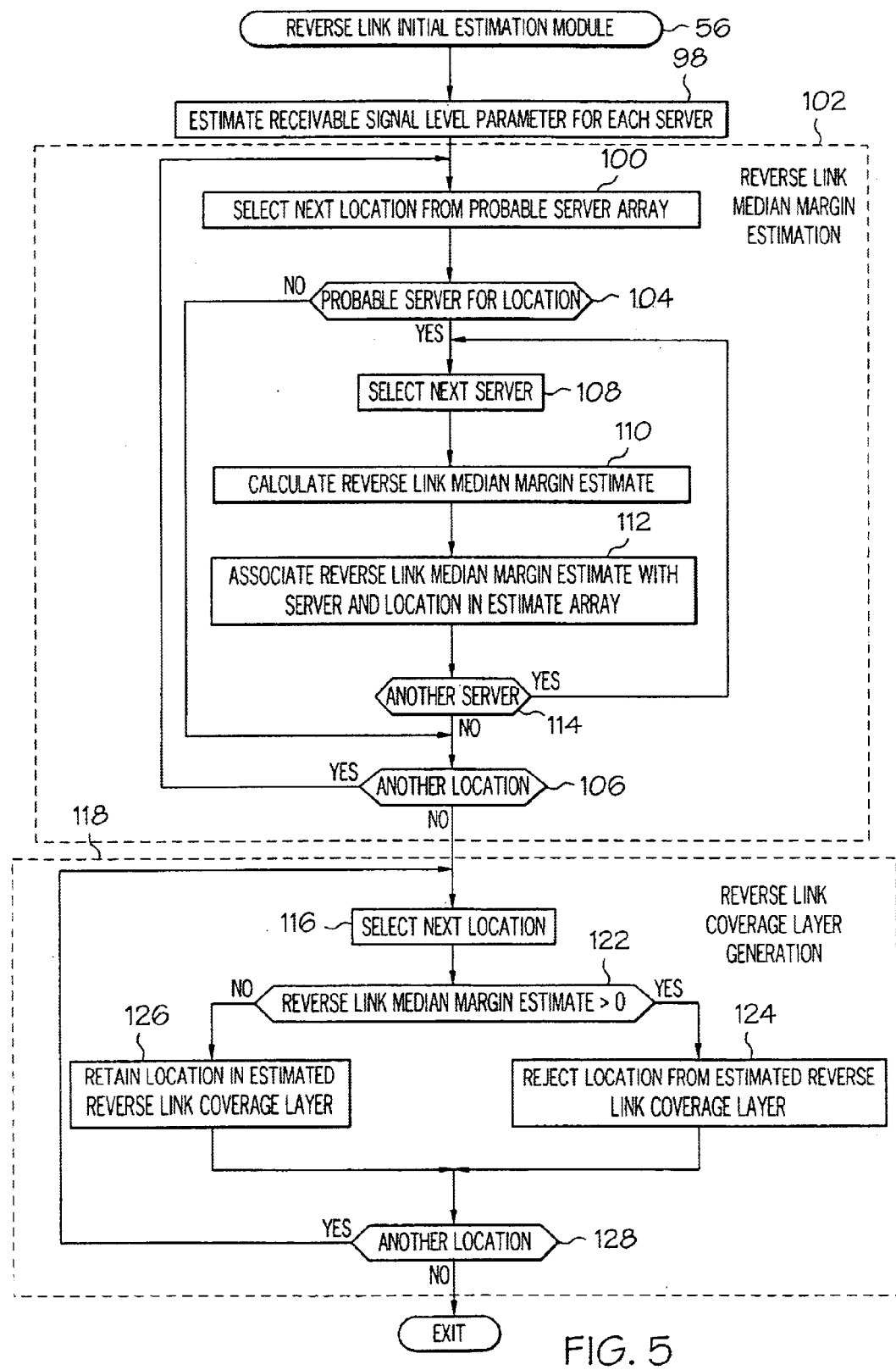
FIG. 5 shows a flow chart of a reverse link initial estimation module.

FIG. 5 shows a flow chart of reverse link initial estimation module 56. That is, FIG. 5 illustrates an exemplary process performed through the execution of module 56. Reverse link initial estimation module 56 is executed to provide an initial reverse link assessment of network 20 (FIG. 1) prior to executing forward link analysis module 58. The estimated parameters resulting from reverse link initial estimation module 56 will be inputs for forward link analysis module 58 when forward link analysis module 58 (FIG. 2) is executed prior to reverse link analysis module 60 (FIG. 2) in network performance analysis process 62 (FIG. 2).

Module 56 begins with a task 98. Task 98 causes processor 38 (FIG. 2) to estimate a receivable signal level parameter, or a required received signal level, $(rsl\_req)_{dBm}$, for each of servers 22 (FIG. 1). Assuming a perfect power control mechanism for reverse link 25 (FIG. 1), all reverse link signals from mobile stations 24 (FIG. 1) that are power controlled by a particular one of servers 22 will be received at the particular one of servers 22 with the same signal level, or power. This signal level is the required power receivable at one of servers 22 so that a user-specified frame error rate (FER) performance requirement is achieved. The receivable signal level parameter, or required received signal level, is defined as follows:

$$(rsl\_req)_{dBm} = (min\_rsl)_{dBm} + (RLrise)_{dB} \quad (11)$$

where $(min\_rsl)_{dBm}$ is the minimum required signal level assuming no other-user interference and $(RLrise)_{dB}$ is a reverse link noise floor elevation factor, $(RLrise)_{dB}$, due to the presence of other-user interference.

In an initial assessment, task 98 of reverse link initial estimation process 56 assumes that there is a zero reverse link noise floor elevation, $(Rlrise)_{dB}$, at server 22. In other words, there is no other-user interference. If there is no other-user interference, the required received signal level, $(rsl\_req)_{dBm}$, at one of servers 22 is estimated as follows:

$$(rsl\_req)_{dBm} = (min\_rsl)_{dBm} \quad (12)$$

and $$(min\_rsl)_{dBm} = 10\sqrt{\frac{\log_{10}(R_b * E_b / (N_O + I_{O,R})_{req} *}{req\_impl\_loss * N_O * NF * rev\_cable\_loss)}} \quad (13)$$

where NF is the noise figure of the receiver at server 22 and rev_cable_loss is a factor that accounts for the cable loss at server 22. Thus, $(min\_rsl)_{dBm}$ is the minimum required received signal level when there is no reverse interference and depends on the thermal noise floor and the required signal to noise ratio for a give frame error rate (FER). Accordingly, task 98 generates an estimate of a required received signal level, $(rsl\_req)_{dBm}$, in the absence of other-user interference, $(RLrise)_{dB}$, for each of servers 22.

Following task 98 of reverse link initial estimation module 56, a task 100 of a reverse link median margin estimation process 102 (denoted by dashed lines) is performed. In CDMA, the reverse link margin is a quantity defined as the ratio (difference in the logarithmic scale) between the maximum transmit power of a mobile station 24 (FIG. 1) and the required transmit power from the mobile station 24 to achieve a desired performance of reverse link 25 (FIG. 1) for a given availability level.

In a preferred embodiment, the desired performance of reverse link 25 is determined from a desired maximum frame error rate (FER), or the ratio of the number of voice or data frames that are received at server 22 with errors over the total number of received frames. As such, FER is a measure of the quality of service provided to the users. The availability level is the probability that the user of mobile station 24 will observe an FER less than or equal to the desired maximum FER value. The availability level may also be interpreted as the percentage of time for which the user is guaranteed satisfactory performance.

Process 102 computes a reverse link median margin estimate, median_marg$_{dB}$[p][j] for each probable server 22 at each of locations 64. The reverse link median margin estimate, median_marg$_{dB}$[p][j], is a reverse link margin estimated for an availability level of fifty percent.

Task 100 of process 102 causes processor 38 (FIG. 2) to select a next one of locations 64 (FIG. 1) from the CDMA probable server array populated at task 78 of probable server identification module 52 (FIGS. 3A and 3B). As discussed in connection with task 78, CDMA probable server array is a data structure that includes each of locations 64 of network 20 and a number of probable servers associated therewith. Thus, processor may select the next one of locations 64 in accordance with a predetermined order of locations 64 within the CDMA probable server array.

Following task 100, a query task 104 is performed. Query task 104 determines if there is a CDMA probable server associated with the selected one of locations 64. If there is not a CDMA probable server associated with the selected location 64, program control proceeds to a query task 106 to determine if there is another one of locations 64 in CDMA probable server array.

However, if query task 104 determines that there is a CDMA probable server for the selected one of locations 64, process 102 proceeds to a task 108. At task 108, a CDMA probable server associated with the selected one of locations 64 is selected.

A task 110 is performed in response to task 108. Task 110 causes processor 38 (FIG. 2) to calculate the reverse link median margin estimate, median_marg$_{dB}$[p][j]. The reverse link median margin estimate, median_marg$_{dB}$[p][j], observed at location "p" with respect to server "j" is defined as follows:

$$\text{median\_marg}_{dB}[p][j] = \text{portable\_max\_ERP}_{dBm} - \text{path\_loss}_{dB}[j][p] + (\text{max\_antenna\_gain})_{dB}[j] - (rsl\_req)dBm[j] \quad (14)$$

where portable_max_ERP$_{dBm}$ is the maximum Effective Radiated Power (ERP) of mobile station 24 (including the mobile station antenna gain), path_loss$_{dB}$[j][p] is the median path-loss between server j and location p, (max_antenna_gain)$_{dB}$[j] is the maximum antenna gain of the server j, and $(rsl\_req)_{dBm} = (min\_rsl)_{dBm}$ as computed in task 98.

Following task 110, a task 112 is performed to associate the calculated reverse link median margin estimate, median_marg$_{dB}$[p][j], with the probable server selected at task 108 and the next one of locations 64 selected at task 100 in an estimate array. Following task 112, a query task 114 is performed.

Query task 114 determines if there is another CDMA probable server in association with the selected one of locations 64 for which the reverse link median margin estimate, median_marg$_{dB}$[p][j], calculation is to be performed. When there is another CDMA probable server, process 102 loops back to task 108 to select the next CDMA probable server and repeat the calculation of the reverse link median margin estimate, median_marg$_{dB}$[p][j], for the next probable server. Thus, query task 114 causes the reverse link median margin estimate, median_marg$_{dB}$[p][j], to be calculated for each CDMA probable server likely to be in a mobile station active set of pilot channels at a selected one of locations 64.

When query task 114 determines that there is not another CDMA probable server, process 102 proceeds to query task 106. Likewise, as discussed previously at query task 104, when query task 104 determines that there are no CDMA probable servers associated with the selected one of locations 64, process 102 proceeds to query task 106.

Query task 106 determines if there is another location 64 in the CDMA probable server array for which process 102 is to be performed. When query task 106 determines that there is another location 64, process loops back to task 100 to select the next location, select the next CDMA probable server associated with that location, and repeat the calculation of the reverse link median margin estimate, median_marg$_{dB}$[p][j], for the next CDMA probable server. Thus, query task 106 causes the reverse link median margin estimate, median_marg$_{dB}$[p][j], to be calculated for every CDMA probable server associated with every one of locations 64 in network 20 (FIG. 1).

When query task 106 determines that there is not another location 64, a task 116 of a reverse link coverage layer generation process 118 (denoted by dashed lines) is performed. Task 116 causes processor 38 to scan the estimate array to select a next one of locations 64.

In a preferred embodiment, process 118 evaluates each of the calculated reverse link median margin estimates, median_marg$_{dB}$[p][j], for each CDMA probable server at each of locations 64 to determine whether those locations 64 may be supported in reverse link 25 (FIG. 1) by the respective CDMA probable servers. Process 118 subsequently generates an estimated reverse link coverage layer of those locations 64 where a mobile station is likely to meet the reverse link requirements (discussed below).

Following task 116, a query task 122 determines if all reverse link median margin estimates, median_marg$_{dB}$[p][j], for the selected location are less than a predetermined threshold. In the preferred embodiment, the predetermined threshold is zero. In other words, query task 122 is performed to determine if the maximum Effective Radiated Power (ERP) of mobile station 24 minus the path_loss$_{dB}$[j][p] plus the maximum antenna gain of the server j is less than the minimum required signal level, (min_rsl)$_{dBm}$, assuming no other-user interference (see equations (11) through (14)).

When query task 122 determines that all reverse link median margin estimates, median_marg$_{dB}$[p][j], are greater than zero, process 118 proceeds to a task 124. At task 124, the location is rejected from or refused entry into an estimated reverse link coverage layer. The net result of task 124 is a rejection of part of the offered call traffic load in subsequent analyses for locations 64 where a mobile station 24 (FIG. 1) may not meet the reverse link requirements because of mobile station transmit power limitations even when there is no reverse link other-user interference.

However, when query task 122 determines that the reverse link median margin estimates, median_marg$_{dB}$[p][j], is less than zero, process 118 proceeds to a task 126. At task 126, the location is retained in the estimated reverse link coverage layer. The net result of task 126 is an inclusion of the offered call traffic load in subsequent analyses in locations 64 where a mobile station 24 (FIG. 1) will meet the reverse link requirements of adequate mobile station transmission power in the absence of reverse link other-user interference.

Following either of tasks 124 and 126, a query task 128 is performed. At query task 128, processor 38 (FIG. 2) determines if there is another one of locations 64. In other words, processor 38 scans the estimate array to locate another one of locations 64.

When query task 128 determines that there is another one of locations 64, process 118 loops back to task 120 to select that location 64 and evaluate the associated reverse link median margin estimates, median_marg$_{dB}$[p][j]. However, when query task 128 determines that there is not another one of locations 64, reverse link coverage layer generation process 118 is complete and the execution of reverse link initial estimation module 56 ends. The product of module 56 is an estimated reverse link coverage layer that describes the region of network 20 (FIG. 1) that can support a mobile station 24 (FIG. 1) in reverse link 25 (FIG. 1). This estimated coverage layer is very conservative since this is the maximum possible reverse link coverage calculated neglecting the effect of the reverse link interference. Hence, the estimated reverse link coverage layer is an initial reverse link assessment of network 20 to be used by forward link analysis module 58 (FIG. 2).

Figure 6:
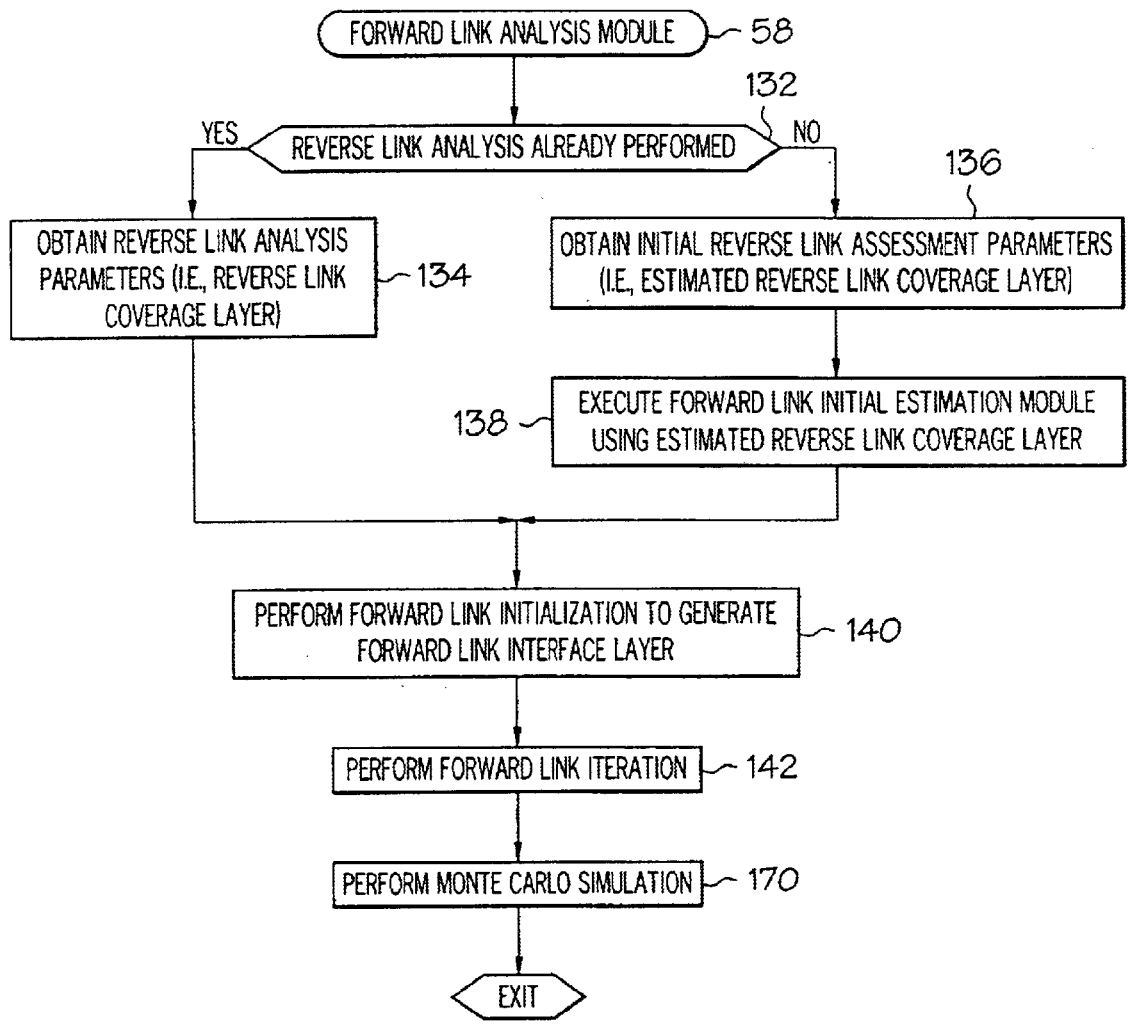
FIG. 6 shows a flow chart of a forward link analysis module.

FIG. 6 shows a flow chart of forward link analysis module 58. That is, FIG. 6 illustrates an exemplary process performed through the execution of module 58. Forward link analysis module 58 is executed to provide an analysis of the average server transmit power necessary to carry the offered call traffic load at a certain performance level. Forward link analysis module 58 also ascertains the margins (forward, interference, and coverage) and the handoff percentages to determine forward link performance.

Module 58 begins with a query task 132. Query task 132 determines if reverse link analysis has already been performed through the implementation of reverse link analysis module 60 (FIG. 2). In a preferred embodiment, forward link analysis module 58 may be executed prior to or following the execution of reverse link analysis module 60 in a network performance analysis, such as the exemplary network performance analysis 62 (described below). The order of execution of modules 58 and 60 depends upon which of forward and reverse links 23 and 25 (FIG. 1) is predicted to be the more limiting of the links. As such, the more limiting of the links will be analyzed prior to the other of links 23 and 25.

At query task 132, when processor 38 (FIG. 2) determines that reverse link analysis has already been performed, through the implementation of reverse link analysis module 60 (FIG. 2), program control proceeds to a task 134. Task 134 causes processor 38 to obtain reverse link analysis output parameters generated through the execution of reverse link analysis module 60 (FIG. 2). In particular, task 134 obtains a reverse link coverage layer generated through the execution of reverse link analysis module 60 (discussed below). This reverse link coverage layer is a compilation of locations 64, "p" (FIG. 1) of network 20 (FIG. 1) that have a calculated reverse link margin, CDMA$_{revdB}$[p], that is greater than a predetermined threshold of zero. That is, only those of locations 64 having a positive reverse link margin, CDMA$_{13}$ rev$_{dB}$[p], in response to the execution of reverse link analysis module 60, are considered when executing forward link analysis module 58.

Alternatively, at query task 132, when processor 38 (FIG. 2) determines that reverse link analysis has not been performed, program control proceeds to a task 136. Task 136 causes processor 38 to obtain initial reverse link assessment output parameters generated through the execution of reverse link initial estimation module 56 (FIG. 5). In particular, task 136 obtains the estimated reverse link coverage layer generated through the execution of process 118 (FIG. 5) of reverse link initial estimation module 56 (FIG. 5). This estimated reverse link coverage layer is a compilation of locations 64, "p" (FIG. 1) of network 20 (FIG. 1) that have a reverse link median margin estimate with respect to at least one of probable servers j, median_marg$_{dB}$[p][j], that is greater than the predetermined threshold of zero. That is, only those of locations 64 having a positive reverse link median margin estimate with respect to at least one of probable servers j, median_marg$_{dB}$[p][j], in response to the execution of reverse link initial estimation module 56, are considered when executing forward link analysis module 58.

A task 138 is performed in connection with task 136. At task 138, processor 38 (FIG. 2) executes forward link initial estimation module 54 (FIG. 4) using the estimated reverse link coverage layer. Referring momentarily to FIG. 4, in connection with task 138, task 88 of module 54 determines the server load at one of servers 22 by analyzing each of locations 64 of network 20 and incrementally updating the call traffic load of the active set of pilots, i.e. the three strongest received pilot channel powers, $E_{c,j}$, at one of locations 64. However, at task 88, the locations 64 analyzed are those locations in the estimated reverse link coverage layer obtained at task 136. Likewise, task 90 causes processor 38 (FIG. 2) to determine a server transmit power for each of servers 22 in the reverse link coverage layer, using equation (9). The parameters obtained through the execution of tasks 92, 94, and 96 are subsequently affected by the total transmit power calculated in response to the estimated reverse link coverage layer obtained at task 136.

Referring back to FIG. 6, following either of tasks 134 and 138, program control of forward link analysis module 58 proceeds to a task 140. At task 140, a forward link initialization process is performed by processor 38 (FIG. 2). The purpose of forward link initialization task 140 is to generate a forward link interference layer. Task 140 is only performed for those locations 64 in an analyzed or estimated reverse link coverage area obtained at either of tasks 134 or 136.

The forward link interference layer is the interference at each location 64 that would be detected by one of mobile stations 24 (FIG. 1) positioned at that location. The forward link interference for each location is the summation of the server transmit power of all servers that are not in the active set for that location, i.e., not in the CDMA probable server list for that location. In other words, the interference is calculated at each of locations 64, given how much power is being transmitted from each of servers 22 that are not in the CDMA probable server list for that location. The product of task 140 may be an interference array that includes each of locations 64 and an interference value associated therewith.

Figure 7:
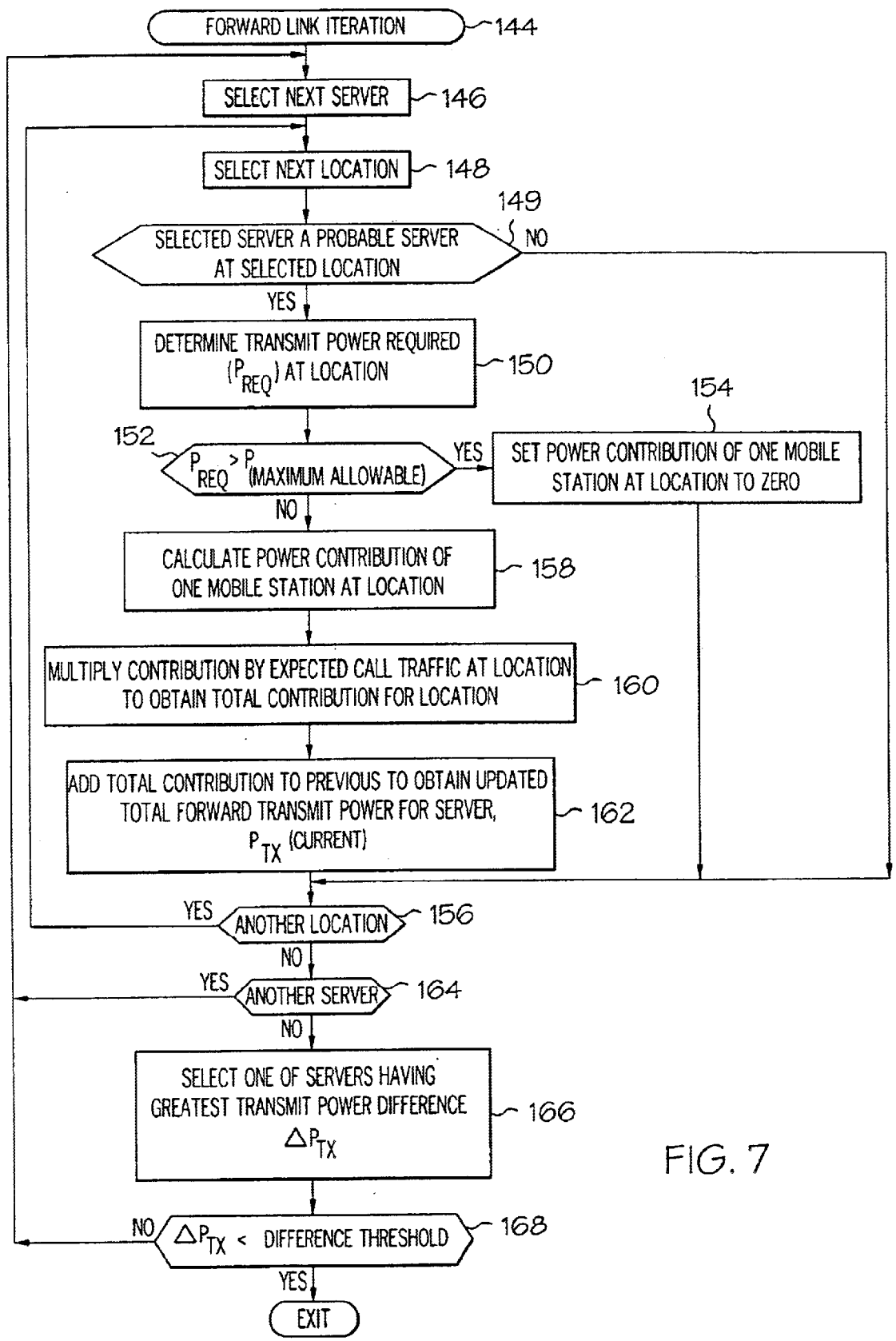
FIG. 7 shows a flow chart of a forward link iteration process of the forward link analysis module.

Following task 140, a task 142 is executed by processor 38. At task 142, a forward link iteration process is performed. FIG. 7 shows a flow chart of a forward link iteration process 144 of forward link analysis module 58. Forward link iteration process 144 is performed to estimate the server power required, given that the call traffic is being carried at a certain performance level (in terms of FER and availability), as specified by the network designer. Accordingly, inputs to process 144 include the reverse link coverage layer obtained at one of tasks 134 and 136, the forward link interference layer generated at task 140 (FIG. 6), the CDMA-only traffic map generated during the execution of task 94 (FIG. 4) of forward link initial estimation module 54 (FIG. 4) or generated during the execution of task 138. In addition, other parameters such as quality of service (QOS), path loss, and most probable handoff criteria may be inputs to process 144.

Process 144 begins with a task 146. At task 146, processor 38 (FIG. 2) selects a next one of servers 22 whose total power is to be calculated. Processor 38 may select one of servers 22 in response to a predetermined listed order as directed by a pointer.

Following task 146, a task 148 causes processor 38 to select a next one of locations 64 in the calculation range of the selected one of servers 22 selected at task 146. Forward link iteration process 144 only considers those of locations 64 having a positive reverse link margin, as listed in the reverse link coverage layer, or a positive reverse link median margin, as listed in the estimated reverse link coverage layer. As such, the tasks of forward link iteration process 144 are performed using either of the analyzed or the estimated reverse link coverage layers. Accordingly, for purposes of the following description the analyzed and the estimated reverse link coverage layers will be referred to herein as simply the reverse link coverage layer.

Following task 148, a query task 149 is performed. Query task 149 determines if the server selected at task 146 is a probable server of the location selected at task 148. When the selected server is not a probable server, program control proceeds to a task 156 (discussed below).

However, when task 149 determines that the selected server is a probable server, program control proceeds to a task 150. At task 150, processor 38 determines a server transmit power, $P_{REQ}$, for the selected one of servers 22 at the selected one of locations 64. In other words, if one of mobile stations 24 (FIG. 1) were located at the selected one of locations 64, the server transmit power, $P_{REQ}$, is the ideal power level that the one of servers 22 would need to transmit to meet certain performance criteria and taking into account some equipment and user settable parameters, such as maximum and minimum traffic power and so forth.

Following task 150, a query task 152 is performed. At query task 152, processor 38 determines if the server transmit power, $P_{REQ}$, for that location 64 is greater than a maximum allowable server transmit power criterion, $P_{(MAXIMUM\ ALLOWABLE)}$ for the selected one of servers 22. $P_{(MAXIMUM\ ALLOWABLE)}$ may be set according to some equipment and user settable parameters. When $P_{REQ}$ is greater than $P_{(MAXIMUM\ ALLOWABLE)}$, process 144 proceeds to a task 154.

At task 154, processor 38 sets a power contribution parameter of the selected one of locations 64 to zero. In other words, if the required server transmit power, $P_{REQ}$, for that location 64 is greater than a maximum allowable server transmit power criterion, $P_{(MAXIMUM\ ALLOWABLE)}$, the selected one of servers 22 cannot support one of mobile stations 24 at a desired performance level. As such, the selected one of locations 64 is not considered to add to the average power level of server 22. Thus, any call traffic at the selected one of servers 22 that cannot be supported on the forward link represents the outage load. Following task 154, process 144 proceeds to a query task 156 (discussed below).

However, if query task 152 determines that $P_{REQ}$ is not greater than $P_{(MAXIMUM\ ALLOWABLE)}$, process 144 proceeds to a task 158. At task 158, processor 38 calculates the power contribution, $P_{CONT,p}$, of one of mobile stations 24 (FIG. 1) if mobile station 24 was located at location 64, p.

In response to task 158, a task 160 multiplies the power contribution, $P_{CONT,p}$, of one of mobile stations 24 by the expected call traffic at the selected one of locations 64 to obtain a total contribution, $P_{CONT,p}$tot, for the selected location 64. The expected call traffic per location may be obtained from the call traffic array populated at task 86 (FIG. 3B) of probable server identification module 52 (FIGS. 3A and 3B).

Following task 160, a task 162 is performed. Task 162 adds the current total server transmit power contribution, $P_{CONT,p}$tot, to a previous total server transmit power contribution, $P_{CONT,p}$tot(previous) to obtain an updated total forward transmit power, $P_{TX}$(current) for the selected one of servers 22, j.

By way of example, at the initiation of forward link iteration process 144, the total forward transmit power is initialized to zero for all servers, i.e., $P_{TX}[j][i]=0$, where j is a server index, and i is an iteration number. Task 162 adds to $P_{TX}[j][i]$ a quantity $P_{CONT,p}$tot, which is the total contribution of traffic at location p to the transmit power of server j. Thus, total forward transmit power, $P_{TX}$(current), is a summation of the required average power for the selected one of servers 22 during the current iteration of forward link iteration 144 and $P_{CONT,p}$tot(previous) is the summation of the total forward transmit power up to the current iteration of forward link iteration 144. The eventual result, following the execution of task 162 for each location can be summarized as follows:

$$P_{TX}[j][i] = \sum_p P_{CONT,p} tot, \qquad (15)$$

p being within the calculation range of j

Accordingly, the total forward transmit power represents a forward link in-cell supported load since call traffic that could not be supported in the forward link was set to zero at task 154. In other words, the offered call traffic that could not be supported in the forward link, i.e., the outage load, was removed from further consideration at task 154.

Following task 162, query task 156 is performed. Likewise, as discussed previously, following task 154, query task 156 is performed. Task 156 determines if there is another one of locations 64 associated with the selected one of servers 22 for which a total contribution, $P_{CONT,p}$tot, for the selected location 64 is to be obtained. When query task 156 determines from the reverse link coverage layer that there is another one of locations 64, process 144 loops back to task 148.

However, when query task 156 determines that there is not another one of locations 64 associated with the selected one of servers 22, process 144 proceeds to a query task 164. At task 164, processor 38 (FIG. 2) determines if there is another one of servers 22 (FIG. 1) from the reverse link coverage layer for which a total forward transmit power, $P_{TX}$(current), is to be calculated. When there is another one of servers 22, process 144 loops back to task 146.

However, when there is not another one of servers 22 for which a total forward transmit power, $P_{TX}$(current), is to be calculated in the reverse link coverage layer, process 144 proceeds to a task 166. In other words, following a negative response to task 164, an average total forward transmit power, $P_{TX}$(current), during a current iteration of process 144 is calculated for each of servers 22. Of course other probable limitations on the total transmit power may be imposed by the user. For example, the average total forward transmit power, $P_{TX}$(current), may be compared with a user defined maximum average power to ensure that server 22 is not requiring more power than is available for that server 22.

At task 166, processor 38 (FIG. 2) selects one of servers 22 having the greatest transmit power difference, $\Delta P_{TX}$. That is, at task 166 processor 38 calculates differences between the current iteration and the previous iteration of the total forward transmit power for all servers j as follows:

$$\Delta P_{TX}[j] = P_{TX}[j][i] - P_{TX}[j][i-1] \qquad (16)$$

Processor 38 then calculates the largest among these differences as follows:

$$\Delta P_{TX} = \max_j \{|\Delta P_{TX}[j]|\} \qquad (17)$$

In response to task 166, a query task 168 compares the difference, $\Delta P_{TX}$, to a predetermined difference threshold. When $\Delta P_{TX}$ is greater than the predetermined difference threshold, process 144 loops back to task 146 to repeat the iterative tasks of forward link iteration process 144.

However, when query task 168 determines that $\Delta P_{TX}$ is less than the difference threshold, forward link iteration 144 exits. Accordingly, query task 168 determines if convergence is achieved. That is, query task 168 determines if the total transmit powers, $P_{TX}[j][i]$, calculated in the current iteration of forward link iteration 144 differ from corresponding total transmit powers, $P_{TX}[j][I-1]$, calculated in the previous iteration of forward link iteration 144 by at most the some specified amount, i.e., the difference threshold, after each iteration. Alternatively, process 144 could be repeated until a user defined maximum number of iterations is achieved. The product of forward link iteration process 144 is average transmit power required by each of servers 22, i.e., $P_{TX}$ on a per server basis.

Referring back to forward link analysis module 58 (FIG. 6), after performing and exiting forward link iteration process 144 at task 142, module 58 proceeds to a task 170. At task 170, processor 38 (FIG. 2) performs a Monte Carlo simulation. As known to those skilled in the art, the purpose of a Monte Carlo simulation is to find the forward, interference, and coverage margins and handoff statistics.

The forward link margin represents the amount of attenuation that both a signal and the interference at a location can sustain relative to a constant thermal noise floor to meet a required ratio of the energy of the information within a bit to the noise within that bit ($E_b/N_o$). A CDMA forward margin of zero (dB) indicates that network 20 (FIG. 1) cannot tolerate any more interference. The interference margin is the difference between the observed and required $E_b/N_o$ at a given location on the forward link. A negative CDMA interference level indicates that the forward link requirements are not met.

A major problem of the forward link analysis involves the effects of a large number of servers, or cell sites, and the log-normal variations of those servers. As such, explicit solution of the performance is difficult given the large number of correlated random variables. The Monte Carlo simulation is performed to provide a reasonable approximation of an explicit solution of the performance of the forward link.

The Monte Carlo simulation uses all significant pilot channels in determining the forward link performance. The Monte Carlo simulation performs an iterative simulation over each location 64 in a group of locations. It adds randomly selected log-normal shadowing values, determines the handoff conditions using the received total forward transmit powers, $P_{TX}$, and user defined handoff parameters. A total number of realizations of the log-normal shadowing are added at each of locations 64 and a distribution is formed including a forward link margin and an interference margin during each realization. User defined Availability parameters is used to determine the forward link margin and an interference margin, and handoff statistics are determined by adding in handoff conditions for each of the shadowing iterations.

Following task 170 and the determination of forward, interference, and coverage margins and handoff statistics using Monte Carlo simulation, forward link analysis module 58 exits. The outputs of the forward link analysis module can include a forward link in-cell supported load, an outage load, the CDMA forward margin (defined above), and a CDMA interference margin (defined above). As discussed previously, the in-cell supported load is a quantity calculated for each of servers 22 and is the supported call traffic on forward link 23 (FIG. 1). As discussed previously, the outage load is the amount of call traffic that cannot be supported on forward link 23. The outage load is effectively the difference between the offered call traffic and the in-cell supported load and is calculated during the execution of forward link iteration process 144 (FIG. 7) and updated in the Monte Carlo simulation.

FIG. 8 shows a flow chart of reverse link analysis module 60. That is, FIG. 8 illustrates an exemplary process performed through the execution of module 60. One of the main factors that determines the performance of reverse link 25 (FIG. 1) is the level of the interference received at each of servers 22. In order to calculate this interference, module 60 models the hand-off mechanism, that is based on forward link Ec/Io information, as well as the reverse link power control mechanism. The forward link Ec/Io is the ratio of the received pilot channel power of one of servers 22 over the total received forward power from all of servers 22. The reverse link power control mechanism is the mechanism that controls the transmit power of mobile stations 24 (FIG. 1).

The quantities that are calculated in reverse link analysis module 60 can be distinguished into two groups. The first group includes those quantities that can be used to assess the actual performance of reverse link 25 (FIG. 1), such as a reverse link margin (discussed below) and a supported in-cell traffic load per server 22. The second group includes those quantities that can be used to evaluate the network design and identify problematic sectors or cells. This second group of quantities includes a noise floor elevation, a frequency reuse efficiency, and a percentage of pole capacity (discussed below).

Module 60 begins with a query task 172. Query task 172 determines if forward link analysis has already been performed through the implementation of forward link analysis module 58 (FIG. 6). In a preferred embodiment, reverse link analysis module 60 may be executed prior to or following the execution of forward link analysis module 58 in a network performance analysis, such as the exemplary network performance analysis 62 (described below). As discussed in connection with module 58 (FIG. 6), the order of execution of modules 58 and 60 depends upon which of forward and reverse links 23 and 25 (FIG. 1) is predicted to be the more limiting of the links. As such, the more limiting of the links will be analyzed prior to the other of links 23 and 25.

At query task 172, when processor 38 (FIG. 2) determines that forward link analysis has not been performed, program control proceeds to a task 174. Task 174 causes processor 38 to obtain initial forward link assessment output parameters generated through the execution of forward link initial estimation module 54 (FIG. 4). In particular, task 174 obtains the estimated value of the total interference power, I_tot[p], calculated at task 92 (FIG. 4) using equation (10) and the CDMA-only traffic map calculated at task 94 (FIG. 4) of module 54.

Alternatively, at query task 172, when processor 38 (FIG. 2) determines that forward link analysis has already been performed, through the execution of forward link analysis module 58 (FIG. 6), program control proceeds to a task 176. Task 176 causes processor 38 to obtain forward link analysis output parameters generated through the execution of forward link analysis module 58 (FIG. 6). In particular, task 176 obtains analyzed values of the total interference power, I_tot[p] and the CDMA-only traffic map calculated through the execution of task 138 (FIG. 6) of module 58 (FIG. 6) in response to the estimated reverse link coverage layer obtained at task 136 (FIG. 6)

Following either of tasks 174 and 176, program control of reverse link analysis module 60 proceeds to a task 178. At task 178, a reverse link initialization process is performed by processor 38 (FIG. 2). The purpose of reverse link initialization task 178 is to initialize, or estimate, reverse link quantities such as an in-cell supported load and the noise floor elevation per server (discussed below).

Task 178 causes processor 38 (FIG. 2) to first initialize an in-cell interfering load for each of servers 22. Task 178 uses the CDMA-only traffic map also obtained at either of tasks 174 or 176. The in-cell interfering load (in_cell_load) for a server is the total call traffic for all locations 64 that have as their CDMA best server the server 22 under consideration. Thus, task 178 accesses the CDMA-only traffic map and assigns an in-cell interfering load (in_cell_load) for each server 22 in response to the call traffic loads of the CDMA-only traffic map.

Following the assignment of an in-cell interfering load for each of servers 22, initialization task 178 initializes reverse link quantities such as frequency reuse efficiency (f_reuse), percentage of pole capacity (x), reverse link noise floor elevation (RLrise), required received signal level (rsl_req), and so forth.

The frequency reuse efficiency (f_reuse) is defined as follows:

$$f\_reuse = \frac{in\_cell\_interf}{total\_interf} \quad (18)$$

where the in_cell_interf is the total number of in-cell interfering users and the total_interf is the total number of interfering users defined as follows:

$$total\_interf = in\_cell\_interf + out\_of\_cell\_interf \quad (19)$$

where the number of out-of-cell interfering users (out_of_cell_interf) for a particular one of servers 22 is defined as the number of equivalent in-cell interfering users which would cause the same level of interference as that caused by all of the out-of-cell interfering users. For example, out_of_cell_interf=1 indicates that all out-of-cell interfering users cause the same interference level at server 22 as one in-cell interfering user. When task 178 is performed, out_of_cell_interf is initially not known. Hence, frequency reuse efficiency is initialized for all of servers 22 to f_reuse=2/3, which is a number typical in CDMA networks (based on hex grid assumptions).

The percentage pole capacity is the maximum capacity of a CDMA server as defined on the reverse link. The percentage of pole capacity, x, for each server 22 is defined as follows:

$$\frac{1}{1-(x/100)} = \frac{I_{O,R} + N_O}{N_O} \quad (20)$$

where $I_{O,R}$ is the reverse link interference power spectral density (in mW/Hz) and $N_o$ is the thermal noise power spectral density (in mW/Hz). Assuming perfect reverse link power control and performing some algebraic manipulations results in the following expression for pole capacity, x:

$$x = 100 \frac{R_b \cdot E_b / (N_O + I_{O,R})_{req} \cdot rev\_impl\_loss}{W} \cdot v \cdot total\_interf \quad (21)$$

where v is the voice activity factor, $R_b$ is the data rate, W is the spread signal bandwidth, rev_impl_loss is a factor that accounts for implementation losses in the server receiver, and $E_b/(N_O+I_{O,R})_{req}$ is the required energy per bit over thermal noise plus interference power spectral density ratio at the server receiver in order to obtain a desired FER performance.

The reverse link noise floor elevation is the rise above thermal noise at a server due to call traffic carried by the CDMA network. The reverse link noise floor elevation (RLrise)$_{dB}$, for each of servers 22 can be calculated using the definition of the percentage of pole capacity, equation (20), as follows:

$$(RLrise)_{dB} = \left(\frac{I_{O,R} + N_O}{N_O}\right)_{dB} = -10 \cdot \log_{10}(1 - x/100) \quad (22)$$

As discussed previously in connection with task 98 (FIG. 5) of reverse link initial estimation module 56 (FIG. 5), assuming a perfect reverse link power control mechanism, all reverse link signals which are power controlled by a specific one of servers 22 are received at the specific server 22 with the same signal strength, or power. This received power is the minimum power so that the user-defined frame error rate (FER) performance requirement is satisfied. When there is other-user interference, the required received signal level, $(rsl\_req)_{dBm}$, is determined at task 178 using equation (11) where the $(rsl\_req)_{dBm}$ is increased by an amount equal to the reverse link noise floor elevation, $(RLrise)_{dB}$, as calculated in equation (22).

In addition to the parameters discussed above, task 178 may initialize parameters that are related to the reverse link iteration convergence mechanism (discussed below). In addition, task 178 may also initialize other parameters and arrays related to reverse link calculations. For example, all arrays containing data retrieved from any reverse link off-line databases may be populated through the execution of task 178.

Following the initialization of reverse link quantities such as the frequency reuse efficiency, f_reuse, the percentage of pole capacity, x, the reverse link noise floor elevation, $(RLrise)_{dB}$, and the required received signal level, rsl_req, reverse link initialization task 178 calculates a reverse link median margin, median_marg[p][j]. As discussed in connection with task 110 of (FIG. 5) of reverse link initial estimation module 56 (FIG. 5, the reverse link median margin is calculated for each of the CDMA probable servers, j, of a specific one of locations 64,p, (FIG. 1). The reverse link median margin observed at location 64, p, with respect to one of servers 22, j, is calculated using equation (14).

Following reverse link initialization task 178, a task 180 is executed by processor 38. At task 180, a reverse link iteration process is performed. FIG. 9 shows a flow chart of a reverse link iteration process 182 of the reverse link analysis module 60. Reverse link iteration process 182 is performed to calculate the in-cell interference, total interference, the reverse link quantities, and the reverse link median margin that were initialized in task 178. The object of reverse link iteration 182 is to obtain accurate values of the in-cell interference, total interference, the reverse link quantities, and the reverse link median margin given the total interference power, I_tot. The total interference power, I_tot, was obtained as an estimated I_tot at task 178 or as an analyzed I_tot at task 180. As such, the tasks of reverse link iteration process 182 are performed using either of the estimated or the analyzed total interference powers, I_tot. Accordingly, for purposes of the following description the estimated or the analyzed total interference powers, I_tot, will be referred to herein as simply the total interference power, I_tot.

Reverse link iteration process 182 begins with a task 184. At task 184, processor 38 (FIG. 2) selects a next one of servers 22 from the CDMA-only traffic map obtained at one of tasks 174 and 176 (FIG. 8). Processor 38 may select one of servers 22 in response to a predetermined listed order as directed by a pointer to the CDMA-only traffic map.

Following task 184, a task 186 is performed. At task 186, processor 38 computes the in-cell interference and the total interference, taking into account the total interference power, I_tot, for each of the locations within the server's calculation range or sector size, whichever is smaller. Task 186 calculates the total number of in-cell and out-of-cell interfering users for server 22 (FIG. 1). The algorithm that is used to calculate the contribution of one of mobile stations 24 (FIG. 1) at a particular one of locations 64 to the interference at the selected one of servers 22 may be outlined according to the following bulleted tasks. This is just an exemplary algorithm. Other algorithms modeling both the hand-off mechanism and the reverse link power control could be used as well.

Calculate the probabilities that a mobile station located at location, p, has as a dominant CDMA probable server, which power controls the mobile station, one of the servers. These probabilities reflect random shadowing and depend on the CDMA hand-off mechanism. Their calculation is based on the reverse link margins and the total interference powers, I_tot, at location p from the server j as follows:

$$(CDMA\_E_cI_O)_{dB}[p][j] = (R_{pilot})_{dBm}[p][j] - (I\_tot)_{dBm}[p] \quad (23)$$

where $(R_{pilot})_{dBm}[p][j]$ is the received pilot channel power at location p, and $(CDMA\_E_cI_O)_{dB}[p][j]$ is another way of denoting pilot over total interference ratios, $E_{c,j}/I_{tot}$.

Calculate the median reverse link margins, $median_{dB}[j]$ from location p to all servers, j,.

Calculate the mobile station median transmit power, $(Tx)_{dBm}[i]$ given that the mobile station is power controlled by a specific one of servers 22, i, (FIG. 1), as follows:

$$(Tx)_{dBm}[i] = portable\_max\_ERP_{dBm} - median_{dB}[i] \quad (24)$$

Calculate the median received signal power, $(Rx)_{dBm}[j][i]$, at server, j, given that the mobile station at location, p, is power controlled by server I as follows:

$$(Rx)_{dBm}[j][i] = (Tx)_{dBm}[i] - path\_loss_{dB}[j][p] \quad (25)$$

The average contribution, $MS\_cont\_to\_total\_cell(p)_{avg}$, of the mobile station located at location p to the total interference, total_interf[j] is as follows:

$$MS\_cont\_to\_total(p)_{avg} = \quad (26)$$
$$CDMA\_Traffic[p] \cdot \left(P[0] \cdot \frac{Rx[j][0]}{rsl\_req[j]} + \ldots + P[j] + \ldots + P[no\_cdma\_servers - 1] \cdot \frac{Rx[j][no\_cdma\_servers - 1]}{rsl\_req[j]}\right)$$

The average contribution, $MS\_cont\_to\_in\_cell(p)_{avg}$, of the call traffic located at location p to in-cell-interference, in_cell_interf[j], is as follows:

$$MS\_cont\_to\_in\_cell(p)_{avg} = CDMA\_Traffic[p] \cdot P[j] \quad (27)$$

The practical limitations related to the size of the database make it impractical to consider a large number of servers as server candidates and to calculate the corresponding probabilities for all of them. Accordingly, this algorithm only considers those servers in the active set, as well as the current server whose interference is being calculated.

The average contribution of a mobile station to the total interference can be summed for each location p to obtain the total interference, total_interf[j] for a server, j. Likewise, the average contribution of the call traffic to the in-cell-interference can be summed for each location p to obtain the in-cell-interference, in_cell_interf[j]. Following task 184, both total_interf(j) and in_cell_interf[j] have been calculated taking into account the total forward link interference, I_tot, and the corresponding pilot over interference ratios, $E_{c,j}/I_{tot}$.

A task 188 is performed in response to task 186. At task 188, processor 38 (FIG. 2) calculates the reverse link quantities. Task 188 uses the equations described in connection with task 178 to calculate the reverse link quantities. For example, equation (18) is used to calculate the frequency reuse efficiency (f_reuse), equation (21) is used to calculate the percentage of pole capacity (x), equation (22) is used to calculate the reverse link noise floor elevation $(RLrise)_{dB}$, and equation (11) is used to calculate the required received signal level, $(rsl\_req)_{dBm}$, where the $(rsl\_req)_{dBm}$ is increased by an amount equal to the reverse link noise floor elevation, $(RLrise)_{dB}$, detected at the server.

The difference between the reverse link quantities calculated at task 188 and the reverse link quantities initialized in task 178 (FIG. 8) is that the reverse link quantities calculated at task 188 have taken into account the total interference, I_tot, and the corresponding pilot over interference ratios, $E_{c,j}/I_{tot}$, through the new calculation of total- and in-cell interference computed at task 186. Accordingly, the reverse link quantities calculated at task 188 more closely represent the actual performance of the reverse link than the initialized values.

Following task 188, a task 190 is performed. Task 190 repeats the calculations of the reverse link median margin, median_marg[p][j], as discussed in connection with task 178 (FIG. 8) of reverse link analysis module 60 (FIG. 8). The reverse link median margin is calculated for each of the CDMA probable servers of a specific one of locations 64 (FIG. 1). The reverse link median margin, median_marg[p][j], observed at location 64, p, with respect to one of servers 22, j, is calculated using equation (14). Like the reverse link quantities, the currently calculated reverse link median margin, median_marg[p][j], more closely represents the actual performance of the reverse link than the reverse link median margin initialized in task 178.

Following task 190, a query task 192 determines if there is another one of servers 22 for which the above calculations are to be performed. When there is another one of servers 22, reverse link iteration process 182 loops back to task 184 to select the next one of servers 22 and perform the above described calculation tasks. However when query task 192 determines that the calculations have been performed for each of servers 22, program control proceeds to a task 194.

At task 194, processor 38 (FIG. 2) selects one of servers 22 having the greatest reverse link noise floor difference, $(\Delta RLrise)_{dB}$. That is, at task 194 processor 38 calculates differences between the current iteration and the previous iteration of reverse link noise floor for all servers j as follows:

$$(\Delta RLrise)_{dB}[j] = (RLrise)_{dB}[j][i] - (RLrise)_{dB}[j][i-1] \quad (28)$$

Processor 38 then calculates the largest among these differences as follows:

$$(\Delta RLrise)_{dB} = \max_j\{|(\Delta RLrise)_{dB}[j]|\} \quad (29)$$

In response to task 194, a query task 196 compares the difference, $(\Delta RLrise)_{dB}$, to a predetermined difference threshold. When $(\Delta RLrise)_{dB}$ is greater than the predetermined difference threshold, process 182 loops back to task 184 to repeat the iterative tasks of reverse link iteration process 182.

However, when query task 196 determines that $(\Delta RLrise)_{dB}$ is less than the difference threshold, reverse link iteration 182 exits. Accordingly, query task 196 determines if convergence is achieved. That is, query task 196 determines if the reverse link noise floor values, $(RLrise)_{dB}[j][i]$, calculated in the current iteration of reverse link iteration 182 differ from corresponding reverse link noise floor values, $(RLrise)_{dB}[j][i-1]$, calculated in the previous iteration of reverse link iteration 182 by at most the some specified amount, i.e., the difference threshold, after each iteration. Alternatively, process 182 could be repeated until a user defined maximum number of iterations is achieved. The products of reverse link iteration process 182 include the reverse link quantities discussed above, such as, reverse link noise floor elevation, percentage of pole capacity, frequency reuse efficiency, in- cell support load.

Referring back to FIG. 8, following reverse link iteration task 180 program control proceeds to a task 198. At task 198, a reverse link analysis final calculation is performed. The final calculation is performed to generate the reverse link coverage layer, discussed previously. Task 198 causes processor 38 to calculate the reverse link margins, CDMA_$rev_{dBm}[p]$, and mobile station transmit powers, MS_TX_$power_{dBm}[p]$.

The reverse link margin is a quantity calculated for each of locations 64 and is used to generate the reverse link coverage layer. The reverse link margins may be calculated as follows:

$$CDMA\_rev_{dB}[p] = mediam\_marg[p][O] - shadowing\_loss_{dB} \quad (30)$$

where O denotes the median margin corresponding to the best server at location p, and the shadowing loss depends on the required availability level and the hand-off status of the mobile station.

The mobile station transmit power is a quantity calculated for each of locations 64 and is the power that a mobile station should transmit in order to achieve satisfactory reverse link frame error rate (FER). The mobile station transmit powers may be calculated as follows:

$$MS\_TX\_power_{dBm}[p] = portable\_max\_ERP_{dBm} - CDMA\_rev_{dBm}[p] \quad (31)$$

The calculated reverse link margins are subsequently used to generate the reverse link coverage layer described previously. The reverse link coverage layer generated at task 198 is similar to the estimated reverse link coverage layer generated through the execution of reverse link coverage layer generation process 118 (FIG. 5) of reverse link initial estimation module 56 (FIG. 5). However, at task 198 the reverse link margins, CDMA_$rev_{dBm}[p]$, are used instead of the reverse link median margin estimates, median_$marg_{dB}[p][j]$. Thus, at task 198 processor 38 includes in the reverse link coverage layer only those locations whose reverse link margin, CDMA_$rev_{dBm}[p]$, are greater than the predetermined threshold of zero. Like the reverse link quantities discussed above, the reverse link coverage layer closely represents the actual performance of the reverse link. Following task 198, module 60 exits.

The products of the implementation of reverse link analysis module 60 include the reverse link quantities discussed above, such as, reverse link noise floor elevation, percentage of pole capacity, frequency reuse efficiency, in-cell support load calculated in reverse link iteration process 144. In addition, the products of reverse link analysis module 60 generated at task 198 include the reverse link-margin, the mobile station transmit power, and the reverse link coverage layer.

FIG. 10 shows a flow chart of network performance analysis process 62. The process of designing a digital wireless network can be both a time and computation intensive task. A fundamental factor in the process of designing the network is to analyze the proposed network's performance for a certain set of parameters. Network performance analysis process 62 is one exemplary process for analyzing a network's performance using the flexible architecture of modules 52, 54, 56, 58, and 60. However, it should become readily apparent in the following discussion, that process 62 may be configured in a number of ways.

Process 62 begins with a task 200. Task 200 causes processor 38 (FIG. 2) to execute probable server identification module 52 (FIGS. 3A and 3B) in order to identify probable ones of servers 22 for each location within network 20 (FIG. 1). Task 200 is executed in process 62 regardless of which of forward link and reverse link analyses 58 and 60, respectively, is to be performed first. The execution of probable server identification module 52 returns to network analysis process 62 a list of CDMA probable servers, a CDMA $E_c/I_o$ ratio array, and a CDMA traffic array.

Following the execution of probable server identification module 52 at task 200, a query task 202 is performed. Query task 202 determines if reverse link analysis is to be performed before forward link analysis. As discussed previously, reverse link analysis is performed prior to forward link analysis when the reverse link is predicted to be the more limiting of the forward and reverse links. Alternatively, forward link analysis is performed prior to reverse link analysis when the forward link is predicted to be the more limiting of the forward and reverse links.

When query task 202 determines that reverse link analysis is to be performed prior to forward link analysis, process 62 proceeds to a task 204. Task 204 causes processor 38 (FIG. 2) to perform an initial forward link assessment by executing the program code of forward link initial estimation module 54 (FIG. 4). The execution of forward link initial estimation module 54 returns to network analysis process 62 an estimated CDMA-only traffic map and estimated total interference powers (I_tot).

Following the execution of initial forward link estimation module 54 at task 204, a task 206 is performed. Task 206 causes processor 38 to implement reverse link analysis by executing the program code of reverse link analysis module 60 (FIG. 8). The execution of reverse link analysis module 60 returns to network analysis process 62 reverse link quality figures that may include accurately calculated values for reverse link noise floor elevation, percentage of pole capacity, frequency reuse efficiency, in-cell support load, reverse link margin, and the reverse link coverage layer.

A task 208 is performed following task 206. Task 208 causes processor 38 to execute forward link analysis by executing the program code of forward link analysis module 58 (FIG. 6). The execution of forward link analysis module 58 returns to network analysis process 62 forward link quality figures that include accurately calculated values for the total server transmit powers, a forward link in-cell supported load, an outage load, a CDMA forward margin, and a CDMA interference margin. However, these values depend upon the analyzed results of the reverse link analysis.

Following task 208, a task 210 produces outputs and reports to summarize the results of tasks 206 and 208. Task 210 will be described in greater detail below.

When query task 202 determines that forward link analysis is to be performed prior to reverse link analysis, process 62 proceeds to a task 212. Task 212 causes processor 38 (FIG. 2) to perform an initial reverse link assessment by executing the program code of reverse link initial estimation module 56 (FIG. 5). The execution of reverse link initial estimation module 56 returns to network analysis process 62 an estimated reverse link coverage layer that describes the region of network 20 that may support a mobile station 24 (FIG. 1) in reverse link 25 (FIG. 1).

Following the execution of initial reverse link estimation module 56 at task 212, a task 214 is performed. Task 214 causes processor 38 to execute forward link analysis by executing the program code of forward link analysis module 58 (FIG. 6). As discussed in connection with task 208, the execution of forward link analysis module 58 returns to network analysis process 62 forward link quality figures that may include accurately calculated values for a forward link in-cell supported load, an outage load, a CDMA forward margin, and a CDMA interference margin.

A task 216 is performed following task 214. Task 216 causes processor 38 to execute reverse link analysis by executing the program code of reverse link analysis module 60 (FIG. 8). As discussed in connection with task 206, the execution of reverse link analysis module 60 returns to network analysis process 62 reverse link quality figures that may include accurately calculated values for reverse link noise floor elevation, percentage of pole capacity, frequency reuse efficiency, in-cell supported load, reverse link margin, and the reverse link coverage layer. However, these values depend upon the analyzed results of the forward link analysis. Like task 208, following task 216 program control proceeds to task 210.

Task 210 may display the outputs and reports of network performance process using charts, color-coded displays, and so forth at output element 42 (FIG. 1) to visualize the results of network performance analysis process 62. The outputs and reports may note mobile station performance at given locations. In addition, the outputs and reports may provide system wide metrics that can help a network designer determine whether to adjust parameter settings (e.g. traffic power settings and adjustments) in order to increase system performance. The determination is based on the results of various layers, reporting features, and other CDMA information that are produced as a result of network performance analysis process 62. These various layers may include, but are not limited to, the following:

A forward layer representing mobile stations' forward link margin available at a given location;

A reverse layer representing the mobile stations' reverse link margin at a given location;

An interference layer showing the amount of interference that a mobile station at a particular location can sustain and still meet the performance criteria input by the network designer;

A coverage layer of the CDMA network showing the area where both the forward channel and the reverse channel can close their links with certain availability percentage;

A CDMA best server layer for depicting to which server each location is most likely connected;

A percentage pole capacity layer indicating the current capacity of each CDMA server in percentage relative to the pole capacity; and so forth Following task 210, process 62 exits.

In summary, the present invention teaches of a system and method for analyzing the performance of a digital wireless communication network. The system and method provide an accurate analysis of both forward link and reverse link performance without the need for a computation intensive iterative analysis process. The accurate analysis is achieved through a flexible architecture that can be appropriately configured and interconnected to analyze the performance of the network in response to the more limiting of the forward and reverse links. The system and method provide an accurate analysis of network performance while taking into consideration the practical limitations of computation complexity, execution time, and cost by introducing the reverse and forward initial estimation modules to provide a reasonable estimate prior to a full reverse link/forward link analysis iteration.

Although the preferred embodiments of the invention have been illustrated and described in detail, it will be readily apparent to those skilled in the art that various modifications may be made therein without departing from the spirit of the invention or from the scope of the appended claims. For example, the network performance analysis process is illustrated to include the two options of reverse link analysis prior to forward link analysis and forward link analysis prior to reverse link analysis. However, another network performance analysis process may limit the network designer to only one of the two options. In addition, those skilled in the art will appreciate that the present invention will accommodate a wide variation in the specific tasks and the specific task ordering used to accomplish the processes described herein.

What is claimed is:

1. A computer-based method, in a network planning tool, for analyzing a performance of a digital wireless network having sectors, said sectors being defined by locations, said method comprising:

identifying probable servers for said locations in said network;

performing an initial reverse link assessment of said network, said performing operation including:

estimating a receivable signal level parameter for each of said probable servers;

computing a reverse link median margin estimate, responsive to said estimated receivable signal level parameter, for said locations;

retaining those of said locations exhibiting said reverse link median margin estimate greater than a predetermined threshold with a corresponding one of said probable servers in a reverse link coverage layer;

executing a forward link analysis in response to said performing operation; and implementing a reverse link analysis in response to said executing operation.

2. A computer-based method as claimed in claim 1 further comprising defining said estimated receivable signal level parameter to be a minimum power receivable, in the absence of a reverse link noise floor elevation factor, at one of said probable servers from said locations to achieve a user-defined performance parameter.

3. A computer-based method as claimed in claim 2 wherein said user-defined performance parameter is a frame error rate (FER).

4. A computer-based method as claimed in claim 1 wherein for each of said locations, said computing operation comprises:

ascertaining a number of said probable servers for said each location; and calculating, for each of said number of said probable servers, said reverse link median margin estimate.

5. A computer-based method as claimed in claim 1 wherein said computing operation comprises:

defining said estimated receivable signal level parameter to be a minimum power receivable at one of said probable servers in the absence of a reverse link noise floor elevation factor; and using said receivable signal level parameter, an effective radiated power (ERP) from said location, a median path loss value between said location and said server, and a server antenna gain of one of said probable servers to determine said reverse link median margin estimate.

6. A computer-based method as claimed in claim 1 wherein said executing operation comprises:

calculating total server transmit powers using said reverse link coverage layer;

determining total interference values;

determining hand-down traffic to analog using said calculated total server transmit powers and said total interference values;

generating a digital communication traffic map in response to said determined hand-down traffic; and re-computing said total server transmit powers and said total interference values in response to said generating operation.

7. A computer-based method as claimed in claim 6 wherein said implementing operation comprises employing said digital communication traffic map and said re-computed ones of said total server transmit powers and said total interference values.

8. A computer-based method as claimed in claim 1 wherein said executing operation comprises generating at least one of a plurality of forward link quality figures to analyze said performance of a forward link of said network.

9. A computer-based method as claimed in claim 8 wherein said plurality of forward link quality figures includes a forward link in-cell supported load value, an outage load value, a forward margin value, and an interference margin value.

10. A computer-based method as claimed in claim 1 wherein said implementing operation comprises generating at least one of a plurality of reverse link quality figures to analyze said performance of a reverse link of said network.

11. A computer-based method as claimed in claim 10 wherein said plurality of reverse link quality figures includes a reverse link margin value, a reverse link noise floor elevation value, a percentage of pole capacity value, a frequency reuse efficiency value, an in-cell supported load value, a mobile station transmit power value, and an updated list of probable servers for each of said locations network.

12. A computer-based method as claimed in claim 1 further comprising:

determining one of said forward and reverse links is a limiting link; and conducting said performing, executing, and implementing operations when said forward link is said limiting link.

13. A computer-based method as claimed in claim 12 further comprising:

performing an initial forward link assessment of said network when said reverse link is said limiting link;

implementing said reverse link analysis in response to said initial forward link assessment; and executing said forward link analysis in response to said reverse link analysis.

14. A computing system, in a network planning tool, for analyzing a performance of a digital wireless network having sectors, said sectors being defined by locations, and said computing system comprising:

a processor;
a computer-readable storage medium; and
executable code recorded on said computer-readable storage medium for instructing said processor to analyze said performance of said network, said executable code including:
a probable server identification module for identifying probable servers for said locations in said network;
a reverse link initial estimation module for providing an initial reverse link assessment of said network;
a forward link initial estimation module for providing an initial forward link assessment of said network;
a forward link analysis module for analyzing a forward link performance of said network; and
a reverse link analysis module for analyzing a reverse link performance of said network;
code for determining which of said forward link analysis module and said reverse link analysis module is to be performed prior to the other of said forward and reverse link analysis modules, wherein:
said forward link analysis module analyzes said forward link performance in response to one of said initial reverse link assessment and said analyzed reverse link performance; and
said reverse link analysis module analyzes said reverse link performance in response to one of said initial forward link assessment and said analyzed forward link performance.

15. A computing system as claimed in claim 14 wherein code instructs said processor to perform instructions comprising:
initiating execution of said reverse link initial estimation module when said forward link analysis module is to be executed prior to said reverse link analysis module; and
initiating execution of said forward link initial estimation module when said reverse link analysis module is to be executed prior to said forward link analysis module.

16. A computing system, in a network planning tool, for analyzing a performance of a digital wireless network having sectors, said sectors being defined by locations, and said computing system comprising:
a processor;
a computer-readable storage medium; and
executable code recorded on said computer-readable storage medium for instructing said processor to analyze said performance of said network, said executable code including:
a probable server identification module for identifying probable servers for said locations in said network;
a reverse link initial estimation module for providing an initial reverse link assessment of said network, said reverse link initial estimation module instructing said processor to perform instructions comprising:
estimating a receivable signal level parameter for each of said probable servers;
computing a reverse link median margin estimate, responsive to said estimated receivable signal level parameter, for said locations; and
retaining those of said locations exhibiting said reverse link median margin estimate greater than a predetermined threshold with a corresponding one of said probable servers in a reverse link coverage layer;
a forward link initial estimation module for providing an initial forward link assessment of said network;
a forward link analysis module for analyzing a forward link performance of said network; and
a reverse link analysis module for analyzing a reverse link performance of said network, wherein:
said forward link analysis module analyzes said forward link performance in response to one of said initial reverse link assessment and said analyzed reverse link performance; and
said reverse link analysis module analyzes said reverse link performance in response to one of said initial forward link assessment and said analyzed forward link performance.

17. A computing system, in a network planning tool, for analyzing a performance of a digital wireless network having sectors, said sectors being defined by locations, and said computing system comprising:
a processor;
a computer-readable storage medium; and
executable code recorded on said computer-readable storage medium for instructing said processor to analyze said performance of said network, said executable code including:
a probable server identification module for identifying probable servers for said locations in said network;
a reverse link initial estimation module for providing an initial reverse link assessment of said network;
a forward link initial estimation module for providing an initial forward link assessment of said network said forward link initial estimation module instructing said processor to perform instructions comprising:
calculating total server transmit powers;
determining total interference values;
determining hand-down traffic to analog;
generating a digital communication traffic map in response to said determined hand-down traffic; and
re-computing said total server transmit powers and said total interference values in response to said generating operation, said digital communication traffic map, said re-computed total server transmit powers, and said total interference values providing said initial forward link assessment of said network;
a forward link analysis module for analyzing a forward link performance of said network; and
a reverse link analysis module for analyzing a reverse link performance of said network, wherein:
said forward link analysis module analyzes said forward link performance in response to one of said initial reverse link assessment and said analyzed reverse link performance; and
said reverse link analysis module analyzes said reverse link performance in response to one of said initial forward link assessment and said analyzed forward link performance.

18. A computer-readable storage medium containing executable code for instructing a processor to analyze a performance of a digital wireless network, said network having sectors, and said sectors being defined by locations, said executable code instructing said processor to perform operations comprising:
identifying probable servers for said locations in said network;
determining which of a forward link analysis and a reverse link analysis is to be performed prior to the other of said forward and reverse link analyses;

when said forward link analysis is to be performed prior to said reverse link analysis, said operations further comprise:
   performing an initial reverse link assessment of said network;
   executing said forward link analysis to analyze a forward link performance in response to said initial reverse link assessment; and
   implementing said reverse link analysis in response to said analyzed forward link performance; and when said reverse link analysis is to be performed prior to said forward link analysis, said operations further comprise:
   performing an initial forward link assessment of said network;
   implementing said reverse link analysis to analyze a reverse link performance in response to said initial forward link assessment; and
   executing said forward link analysis in response to said analyzed reverse link performance.

* * * * *